United States Patent
Yates et al.

(10) Patent No.: US 11,404,911 B2
(45) Date of Patent: Aug. 2, 2022

(54) WIRELESS POWER TRANSFER SYSTEM

(71) Applicant: INPERIAL COLLEGE INNOVATIONS LIMITED, London (GB)

(72) Inventors: David Yates, London (GB); George Kkelis, London (GB); Paul Mitcheson, London (GB); Samer Aldhaher, London (GB)

(73) Assignee: IMPERIAL COLLEGE INNOVATIONS LIMITED, London (GB)

( * ) Notice: Subject to any disclaimer, the term of this patent is extended or adjusted under 35 U.S.C. 154(b) by 0 days.

(21) Appl. No.: 16/464,808

(22) PCT Filed: Nov. 29, 2017

(86) PCT No.: PCT/GB2017/053607
§ 371 (c)(1),
(2) Date: May 29, 2019

(87) PCT Pub. No.: WO2018/100374
PCT Pub. Date: Jun. 7, 2018

(65) Prior Publication Data
US 2019/0288563 A1 Sep. 19, 2019

(30) Foreign Application Priority Data

Nov. 29, 2016 (GB) ...................................... 1620236
Dec. 2, 2016 (GB) ...................................... 1620552

(51) Int. Cl.
*H02J 50/12* (2016.01)
*H02M 1/08* (2006.01)
(Continued)

(52) U.S. Cl.
CPC ............. *H02J 50/12* (2016.02); *H02M 1/083* (2013.01); *H02M 3/335* (2013.01);
(Continued)

(58) Field of Classification Search
CPC .......... H02J 50/12; H02J 7/025; H02M 3/335; H02M 1/083; H02M 3/33592; H02M 7/06;
(Continued)

(56) References Cited

U.S. PATENT DOCUMENTS

2014/0159646 A1* 6/2014 Sankar ................... H02J 7/025
320/107
2017/0302086 A1* 10/2017 Kwan ..................... H02J 50/12

FOREIGN PATENT DOCUMENTS

CN 105119391 A 12/2015
CN 105247761 A 1/2016
(Continued)

OTHER PUBLICATIONS

P. C. K. Luk and S. Aldhaher, "Analysis and design of a Class D rectifier for a Class E driven wireless power transfer system," 2014 IEEE Energy Conversion Congress and Exposition (ECCE), Pittsburgh, PA, 2014, pp. 851-857. (Year: 2014).*
(Continued)

*Primary Examiner* — Daniel Cavallari
(74) *Attorney, Agent, or Firm* — Merchant & Gould P.C.

(57) ABSTRACT

Disclosed herein is a rectifier circuit for receiving an AC signal from a receiver coil in an inductive power transfer system. The circuit is configured to operate at an operating frequency. The circuit comprises a Class-E rectifier; an AC signal supplier configured to supply an AC signal to the rectifier circuit; and a resonant network having an inductor and a capacitor. The resonant network has a resonant fre-
(Continued)

quency, and the ratio of the resonant frequency to the operating frequency is within the range of 1.75 to 3.

19 Claims, 13 Drawing Sheets

(51) Int. Cl.
| | |
|---|---|
| *H02M 3/335* | (2006.01) |
| *H02M 7/06* | (2006.01) |
| *H02M 7/537* | (2006.01) |
| *H02J 7/02* | (2016.01) |
| *H02M 1/00* | (2006.01) |
| *H02M 7/48* | (2007.01) |

(52) U.S. Cl.
CPC ......... *H02M 3/33592* (2013.01); *H02M 7/06* (2013.01); *H02M 7/537* (2013.01); *H02J 7/025* (2013.01); *H02M 1/0058* (2021.05); *H02M 7/4815* (2021.05); *Y02B 70/10* (2013.01)

(58) Field of Classification Search
CPC ......... H02M 7/537; H02M 2001/0058; H02M 2007/4815; Y02B 70/10
See application file for complete search history.

(56) References Cited

FOREIGN PATENT DOCUMENTS

| | | |
|---|---|---|
| WO | WO 2014/029961 A1 | 2/2014 |
| WO | WO 2016/124576 A1 | 8/2016 |

OTHER PUBLICATIONS

Nagashima et al., "Analysis and Design of Loosely Inductive Coupled Wireless Power Transfer System Based on Class-E DC-DC Converter for Efficiency Enhancement," in IEEE Transactions on Circuits and Systems I: Regular Papers, vol. 62, No. 11, pp. 2781-2791, Nov. 2015. (Year: 2015).*

T. Nagashima, X. Wei, E. Bou, E. Alarcón, M. K. Kazimierczuk and H. Sekiya, "Analysis and Design of Loosely Inductive Coupled Wireless Power Transfer System Based on Class-E2 DC-DC Converter for Efficiency Enhancement," in IEEE Transactions on Circuits and Systems I: Regular Papers, vol. 62, (Year: 2015).*

G. Kkelis, D. C. Yates and P. D. Mitcheson, "Comparison of current driven Class-D and Class-E half-wave rectifiers for 6.78 MHz high power IPT applications," 2015 IEEE Wireless Power Transfer Conference (WPTC), 2015, pp. 1-4, doi: 10.1109/WPT.2015.7140166. (Year: 2015).*

S. Aldhaher, P. C. Luk, K. E. K. Drissi and J. F. Whidborne, "High-Input-Voltage High-Frequency Class E Rectifiers for Resonant Inductive Links," in IEEE Transactions on Power Electronics, vol. 30, No. 3, pp. 1328-1335, Mar. 2015, doi: 10.1109/TPEL.2014.2316170. (Year: 2015).*

PCT International Search Report and Written Opinion of the ISA for PCT/GB2017/053607 dated Feb. 14, 2018, 19 pages.

Kwan Christopher H et al.: "Link efficiency-led design of mid-range inductive power transfer systems", 2015 IEEE PELS Workshop on Emerging Technologies: Wireless Power (2015 WOW), IEEE, Jun. 5, 2015 (Jun. 5, 2015), pp. 1-7, XP032789393, DOI: 10.1109/WOW.2015.7132845 [retrieved on Jun. 24, 2015] the whole document.

Kkelis George et al.: "Hybrid Class-E low dv/dt rectifier for high frequency inductive power transfer", 2016 IEEE Wireless Power Transfer Conference (WPTC), IEEE, May 5, 2016 (May 5, 20165), pp. 1-4, XP032916171, DOI: 10.1109AVPT.2016.7498765 [retrieved on Jun. 23, 2016] the whole document.

Chinese Office Action, Chinese Application No. 2017800848845, dated Jun. 29, 2021, pp. 18.

"Link Efficiency-Led Design of Mid-Range Inductive Power Transfer Systems", Christopher H. Kwan et al. 2015 IEEE PELS Workshop on Emerging Technologies: Wireless Power (2015 WoW), IEEE, 5, Jun. 2015.

"Typical Circuit for Soft-switching Technology", Jie Li and Xiaojie Chao, "Power Electronic Technology", pp. 153-156, Jul. 2015.

"Phase-shift Control Full Bridge Zero-voltage-switching PWM DC Converter", Fengji, Qi, pp. 179-180, "Communication Power Supply", Nov. 1997.

Marian Kazimierczuk & Dariusz Czarkowski, Resonant Power Converters 72 et seq. (2d ed. 2011) ("Kazimierczuk").

K. H. Lee et al., *Design of GaN Transistorbased Class E DC-DC Converter With Resonant Rectifier Circuit*, Proc. IEEE 3rd Workshop Wide Bandgap Power Devices Appl., Nov. 2015, at 275-280.

Kkelis, G. et al., *Class-E half-wave zero dv/dt rectifiers for inductive power transfer*, IEEE Transactions on Power Electronics, vol. 32, No. 11, pp. 8322-8337, Nov. 2017.

* cited by examiner

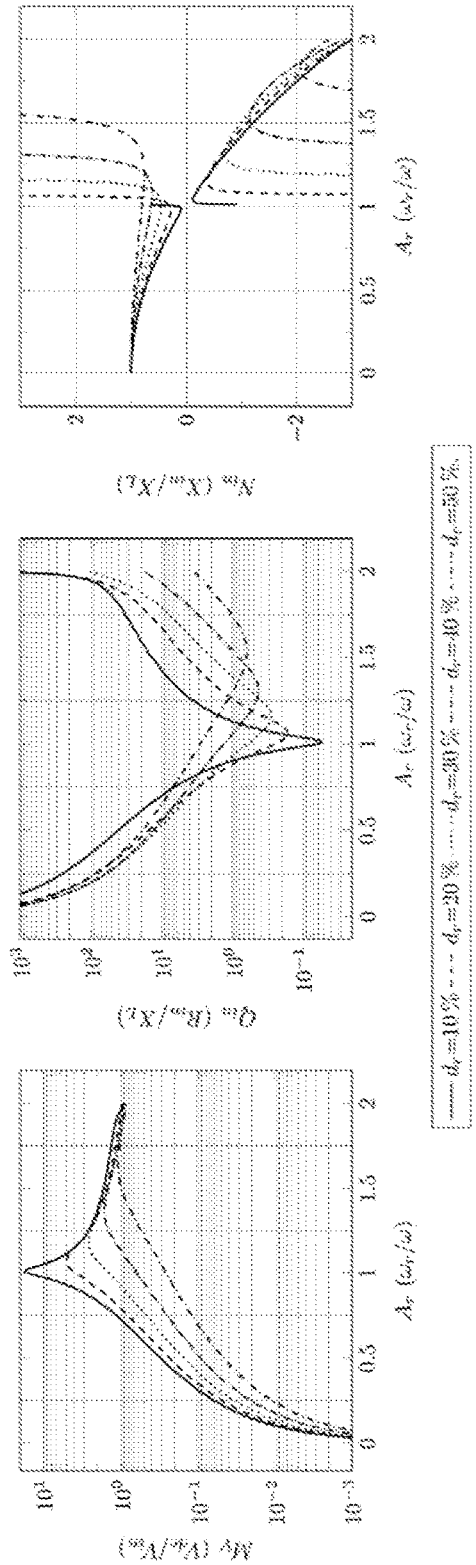
Fig. 3c
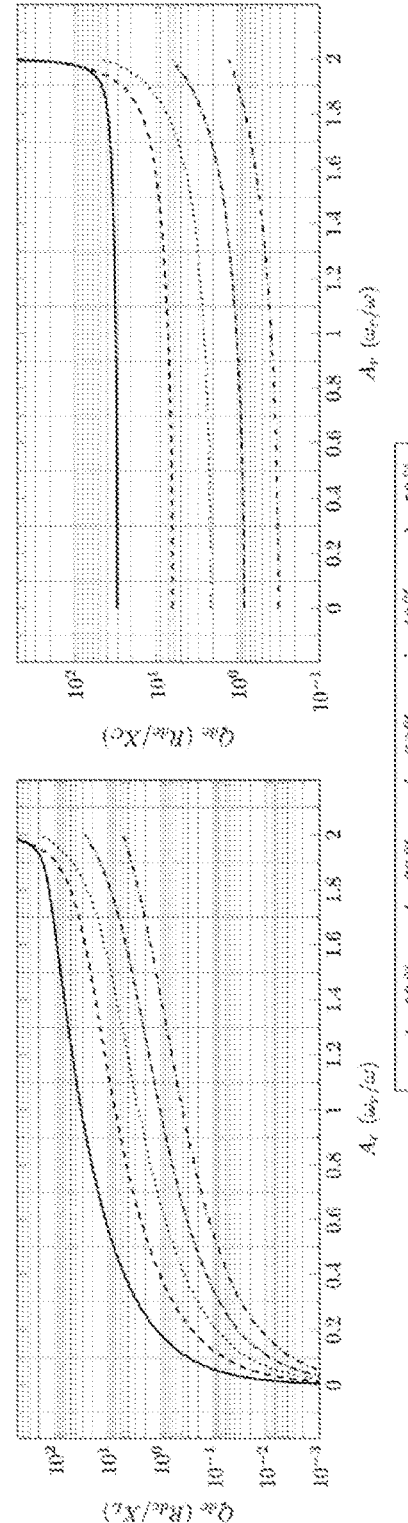
Fig. 4b
Fig. 4a

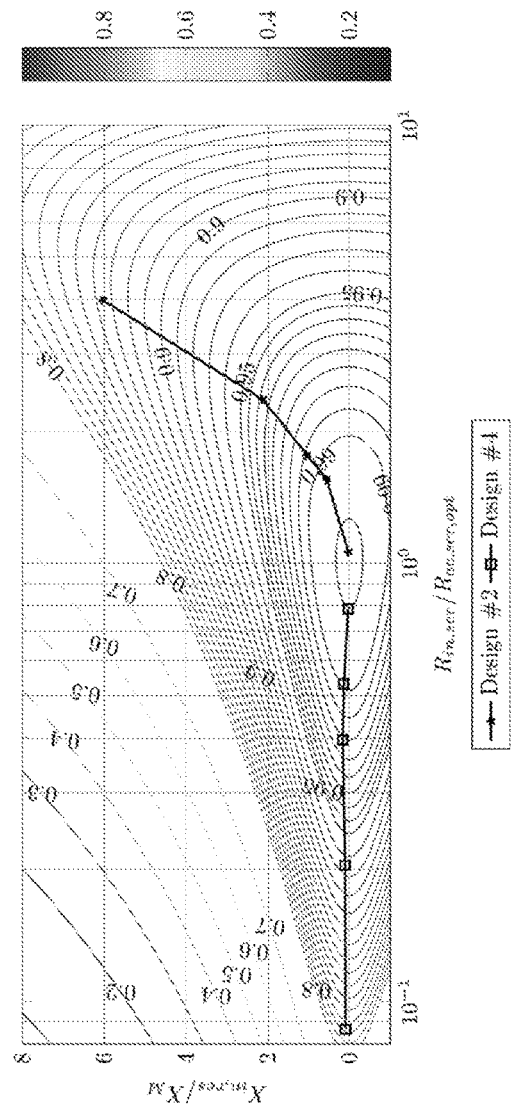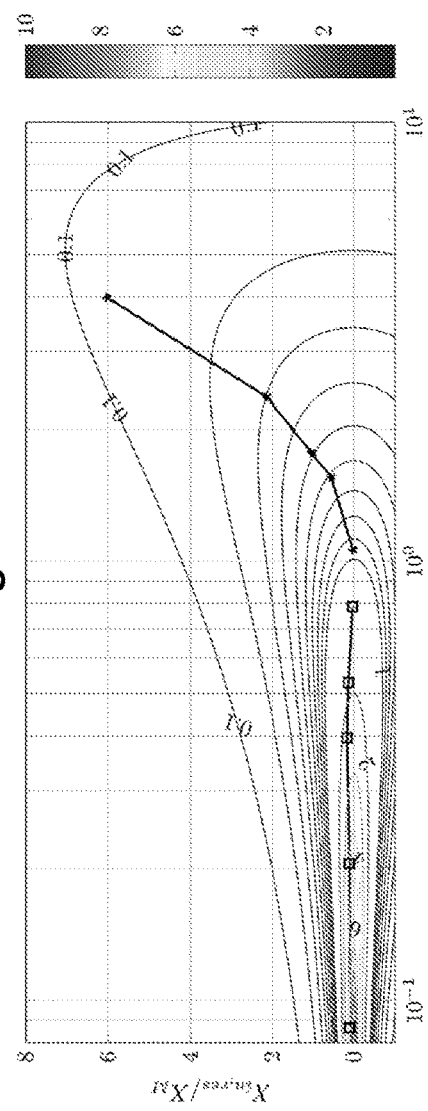
Fig. 6a
Fig. 6b

WIRELESS POWER TRANSFER SYSTEM

PRIORITY CLAIM

The present application is a National Phase entry of PCT Application No. PCT/GB2017/053607, filed Nov. 29, 2017, which claims priority from GB Patent Application No. 1620236.8, filed Nov. 29, 2016, and GB Patent Application No. 1620552.8, filed Dec. 2, 2016, all of which are hereby fully incorporated herein by reference.

TECHNICAL FIELD

This disclosure relates to inductive power transfer, and in particular to a Class-E rectifier for use in an inductive power transfer circuit.

BACKGROUND

Wireless power transfer has many industrial applications, and devices utilizing wireless power transfer, such as wireless toothbrush chargers, wireless charging pads for mobile devices, and wirelessly charged medical devices implanted within the body, continue to grow in popularity.

Inductive power transfer (IPT) is an example of wireless power transfer (WPT). In an example inductive power transfer system, an alternating current passes through a transmitter coil. This causes the transmitter coil to produce a time-varying magnetic field. When a receiver coil is placed in the time-varying magnetic field, the magnetic field induces an alternating current in the receiver coil, which can then be used to drive a load. Thus, power is transmitted wirelessly from the transmitter coil to the receiver coil through the time-varying magnetic field.

Strongly coupled inductive links tend to operate in the tens to hundreds of KHz region. In contrast, weakly coupled inductive links tend to operate in the low MHz region in order to increase their link efficiency ($\eta_{link}$). The optimal link efficiency ($\eta_{link,opt}$) of an inductive link can be described by:

$$\eta_{link,opt} = \frac{k^2 Q_{rx} Q_{tx}}{\left(1 + \sqrt{1 + k^2 Q_{rx} Q_{tx}}\right)^2}, \tag{1}$$

where parameter k is the magnetic coupling between the coils forming the link and $Q_{rx}$ and $Q_{tx}$ are the unloaded quality factors of the receiving ($L_{rx}$) and transmitting ($L_{tx}$) coils respectively. The unloaded quality factor of a coil can be defined as the ratio of the reactance of the coil to the equivalent series resistance of the coil at a particular frequency.

In inductive links with air core coils the coupling factor can vary from approximately 1% to approximately 10%. Such coupling factor values are relatively low when compared to inductive links that utilize ferrite in their coils. Hence, weakly coupled inductive links tend to operate in the low MHz region in order to increase their optimal link efficiency ($\eta_{link,opt}$) by increasing the unloaded quality factors of the coils forming the link compensating for the low coupling factor.

The optimal link efficiency of a particular inductive link geometry occurs when the receiving coil is tuned at the frequency of the generated magnetic field, and the ratio of the AC load resistance ($R_{ac}$) to the reactance of the tuning capacitor ($C_{rx}$) satisfies a certain value ($\alpha_{opt}$). The $\alpha_{opt}$ value is defined in the following two expressions and it depends upon the coupling factor between the coils forming the inductive link, the unloaded quality factors of the two coils, and the tuning method of $L_{rx}$, parallel (FIG. 1a) or series (FIG. 1b).

$$\alpha_{opt,par} = \frac{Q_{rx}}{\sqrt{1 + k^2 Q_{rx} Q_{tx}}}, \tag{2}$$

$$\alpha_{opt,ser} = \frac{\sqrt{1 + k^2 Q_{rx} Q_{tx}}}{Q_{rx}}. \tag{3}$$

When a rectifier is added to an inductive link, for example when a rectifier is added to the receiver side circuit of any of FIGS. 1a-b, its input resistance will be the AC load. Accordingly, the rectifier should be chosen according to optimal link efficiency requirements. Furthermore, the rectifier topology should be chosen such that it is efficient at the frequency of operation; it is compatible with the output type of the tuned receiving coil, whether that be voltage output for parallel tuned receiving coil (FIG. 1a) or current output for series tuned coil (FIG. 1b); and such that its input reactance is absorbed by $C_{rx}$ such that the tuning of $L_{rx}$ is unaffected.

Class-E rectifiers are considered good possible candidates for integration in multi-MHz applications due to their efficient soft-switching capability and the consequent low electromagnetic interference (EMI) operation this allows.

SUMMARY

An invention is set out in the independent claims. Optional features are set out in the dependent claims.

Disclosed herein is a rectifier circuit for receiving an AC signal from a receiver coil in an inductive power transfer system. The circuit comprises a Class-E rectifier, and is configured to operate at an operating frequency. The circuit comprises a resonant network having a resonant frequency, wherein the ratio of the resonant frequency to the operating frequency is within the range of 1.75 to 3.

According to a first aspect, a rectifier circuit for receiving an AC signal from a receiver coil in an inductive power transfer system is provided. The circuit comprises a Class-E rectifier and an AC signal supplier configured to supply an AC signal to the rectifier circuit. The circuit is configured to operate at an operating frequency. The circuit comprises a resonant network having a resonant frequency. The resonant network is an LC network comprising an inductor and a capacitor, and the ratio of the resonant frequency to the operating frequency is within the range of 1.75 to 3.

The AC signal supplier may be separate and discrete from the resonant network, and in turn the resonant network may be separate and discrete from the AC signal supplier. In particular, the inductor and the capacitor of the resonant network may be separate and discrete from the AC signal supplier. In embodiments where the AC signal supplier is a receiver coil arranged to receive an AC signal and introduce and/or supply the AC signal to the rectifier circuit, the resonant network and its constituent components may be separate and discrete from the receiver coil. In particular, the inductor of the resonant network may be external to the AC signal supplier, and in particular may be external to a receiver coil. Hence, the inductor may be comprised outside of the receiver coil, and be arranged in the rectifier circuit to provide an inductance in addition to any inherent inductance of the AC signal supplier.

Optionally, the inductor of the resonant network may be coupled to the AC signal supplier. The inductor may be directly coupled to the AC signal supplier.

Optionally, the inductor of the resonant network may be arranged in series with the AC signal supplier.

Optionally, the circuit comprises the receiver coil. In other words, the AC signal supplier comprises the receiver coil.

Optionally, the receiver coil is an air core coil.

Optionally, the operating frequency is determined by the AC signal from a receiver coil.

Optionally, the rectifier circuit is coupled to a Class-D inverter, and the operating frequency is determined by the output frequency of the Class-D inverter.

Optionally, the rectifier circuit is coupled to a Class-E inverter, and the operating frequency is determined by the output frequency of the Class-E inverter.

Optionally, the rectifier circuit is coupled to a Class-EF inverter, and the operating frequency is determined by the output frequency of the Class-EF inverter.

In other words, the AC signal supplier may be a receiver coil and/or an inverter. The inverter may be a Class-D inverter, a Class-E inverter, a Class-EF inverter, or any inverter disclosed herein.

Optionally, the inverter is arranged to drive a load resistance, and comprises a switching device arranged between a power source and ground and arranged to switch at a switching frequency. A resonant network is arranged in parallel with the switching device between the power source and ground, the resonant network having a resonant frequency which is a non-integer multiple of the switching frequency, such that, in operation, a substantially constant current passes through the load resistance.

Optionally, the operating frequency is determined by the output frequency of a resonant tank circuit comprising an inductor and a capacitor.

Optionally, the ratio of the resonant frequency to the operating frequency is within the range 1.75 to 2, optionally within the range 1.8 to 2, and optionally in the range 1.8 to 1.9.

Optionally, the rectifier circuit further comprises a diode, and optionally wherein a parallel capacitor is placed across the diode.

Optionally, the AC signal is an input voltage; the capacitor of the resonant network is coupled to the input voltage and has a capacitance Cs; and the parallel capacitor has a capacitance Cp, the ratio of Cp to Cs being above zero. Advantageously, such a hybrid class-E rectifier can emulate any input AC resistance for any given DC resistance ($R_{dc}$).

Optionally, the rectifier is a non-synchronous rectifier.

Optionally, the ratio of the resonant frequency to the operating frequency is within the range 2 to 3.

Optionally, the rectifier circuit further comprises a transistor.

Optionally, the rectifier is a synchronous rectifier.

According to another aspect, a combined inverter-rectifier circuit comprising a rectifier circuit coupled with an inverter circuit is provided. The rectifier circuit is as described above and herein, and the inverter is suitable Class 'EF' operation. The inverter is arranged to drive a load resistance, and the inverter comprises a switching device arranged between a power source and ground, the switching device arranged to switch at a switching frequency. The inverter also comprises a resonant network arranged in parallel with the switching device between the power source and ground, the resonant network having a resonant frequency which is a non-integer multiple of the switching frequency, such that, in operation, a substantially constant current passes through the load resistance.

Disclosed herein is a combined inverter-rectifier circuit comprising a rectifier circuit coupled with an inverter circuit is provided. The rectifier circuit is as described above and herein, and the inverter is suitable Class 'EF' operation. The inverter is arranged to drive a load resistance, and the inverter comprises a switching device arranged between a power source and ground, the switching device arranged to switch at a switching frequency. The inverter also comprises a resonant network arranged in parallel with the switching device between the power source and ground, the resonant network having a resonant frequency which is a non-integer multiple of the switching frequency, such that, in operation, a substantially constant current passes through the load resistance.

According to another aspect, a Class-E inverter circuit for driving a transmitter coil in an inductive power transfer system is provided. The inverter is arranged to drive a load resistance and comprises a switching device arranged to switch at a switching frequency, and a resonant network arranged in parallel with the switching device. The circuit is arranged such that, at the moment the switching device is switched on, a voltage across the switching device is zero or substantially zero and a time derivative of the voltage is negative; and at the moment the switching device is switched off, a voltage across the switching device is zero or substantially zero.

According to another aspect, a method of switching a switching device in a Class-E inverter circuit is provided. The inverter is arranged to drive a load resistance, and comprises a switching device arranged to switch at a switching frequency, and a resonant network arranged in parallel with the switching device. The method comprises switching the switching device on when a voltage across the switching device is substantially zero and a time derivative of the voltage is negative; and switching the device off when a voltage across the switching device is substantially zero.

Optionally, the load resistance comprises the reflected resistance of at least one receiver coil.

Optionally, the load resistance comprises the reflected resistance from a receiving resonant tank circuit.

Optionally, the inverter is coupled to the rectifier of any of claims 1 to 16.

Optionally, the switching device is a transistor.

Optionally, the inverter circuit comprises a capacitor arranged in parallel with the switching device.

Optionally, the resonant network comprises an inductor and a capacitor arranged in series with each other.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Specific embodiments are now described with reference to the drawings, in which:

FIG. 3c depicts $M_Y$, $Q_{in}$, and $N_{IN}$ as a function of $A_r$ for a class E topology for duty cycles from 50% to 10%, in steps of 10%.

FIG. 4a depicts variation of the loaded Q for a voltage driven rectifier with a series inductor.

FIG. 4b depicts variation of the loaded Q for a hybrid rectifier, current driven rectifier and voltage driven rectifier with a series capacitor.

FIG. 6a shows experimental data, and in particular shows the experimental data shown in FIG. 5b, mapped onto contours of link efficiency, reflected resistance to the transmitting coil, and reflected reactance to the transmitting coil. From 80% to 95% the contours appear in steps of 1% and from 95% to 99% in steps of 0.5%.

FIG. 6b shows experimental data, and in particular shows the experimental data shown in FIG. 5c, mapped onto contours of link efficiency, reflected resistance to the transmitting coil, and reflected reactance to the transmitting coil. From 0.1 to 1 the contours appear in steps of 0.1 and the in steps of 1.

Figure 1A:
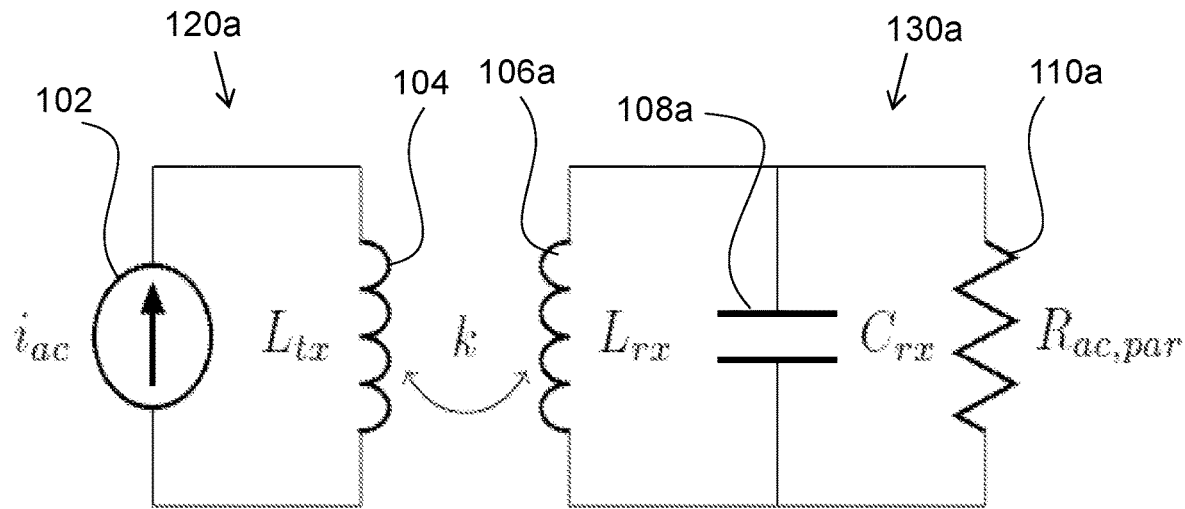
FIG. 1a depicts a circuit arrangement comprising a parallel tuned receiving coil.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

Overview

It has previously been thought that, in a Class-E Zero dv/dt rectifier, it was necessary for the rectifier to exhibit a resistive input impedance. It was thought that a resistive input impedance was required due to a requirement by further inductor-capacitor networks added in the circuit to compress the load seen by the inverter as the output DC load varies.

However, existing arrangements struggle with two problems. First, the Class-E rectifier's input reactance varies as the DC load of the system changes. Second, it has proved difficult to regulate the output voltage of prior systems.

As will be discussed in further detail below, existing approaches to solve these problems necessarily involve energy storage components and/or additional external circuitry. However, these additional components are volume consuming, take up PCB real-estate, and unduly increase the physical size and weight of the system. These components also increase the cost of the system. It will be appreciated that this is not ideal in a commercial WPT application.

The variable $A_r$ can be defined as the ratio of the resonance frequency of the LC network ($\omega_r$) of the Class-E rectifier to the operating frequency (w). A Class-E rectifier circuit with an $A_r$ larger than 1.5 has never been considered, let alone designed before, because of the prevailing assumption in the art that the Class-E rectifier should be designed to present a resistive input impedance. With this prevailing assumption in mind, the vast majority of Class-E rectifiers in the prior art have an $A_r$ that tends to 0. Again with this prevailing assumption in mind, in some specific arrangements the $A_r$ value may either equal to 1, or be as close to 1 as possible.

As will be discussed in greater detail below, the provision of a Class-E Zero dv/dt rectifier with an $A_r$ between 1.75-3 has been found to address these problems. In particular, a Class-E Zero dv/dt non-synchronous rectifier topology designed with an $A_r$ in the range of 1.75-2, and a Class-E Zero dv/dt synchronous rectifier topology designed with an $A_r$ in the range of 2-3, exhibit low deviation in input reactance by the rectifier as the load on the system changes, and inherent output voltage regulation with variation of the DC load ($R_{dc}$).

DETAILED DESCRIPTION OF THE DRAWINGS

Figure 1B:
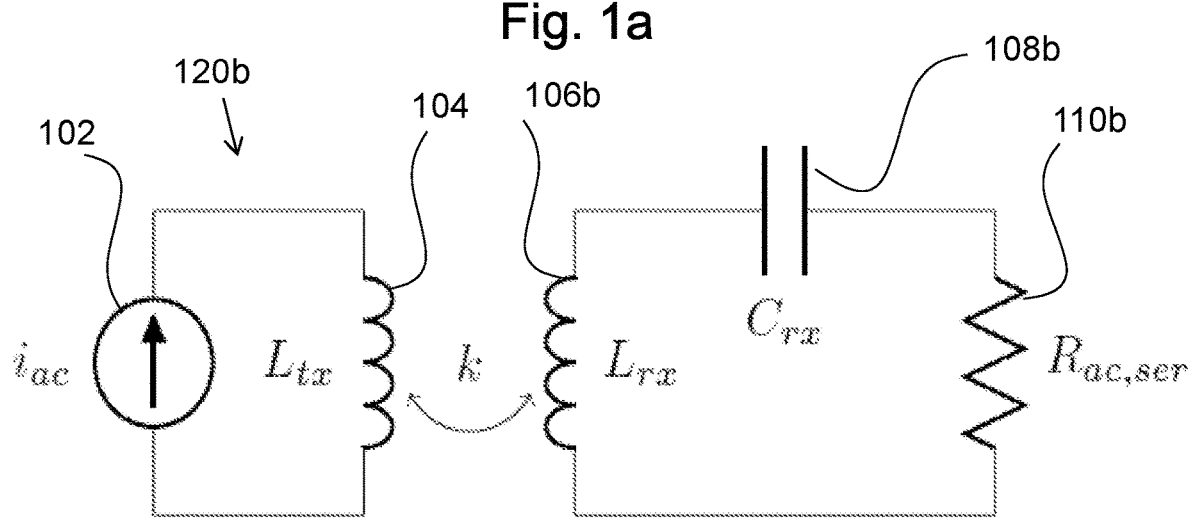
FIG. 1b depicts a circuit arrangement comprising a series tuned receiving coil.

FIG. 1a and FIG. 1b show inductive link circuit configurations, each having a simple transmitter circuit 120 and a simple receiver circuit 130. Each of the transmitter and receiver circuits has a coil, and the magnetic coupling of the coils of the transmitter and receiver circuits can be represented by k. A current source 102 introduces a current $I_{ac}$ into the transmit side circuit. The transmit coil 104 has an inductance $L_{tx}$.

The receiver side circuit comprises a receiver coil 106 having an inductance $L_{rx}$. In FIG. 1a, a capacitor 108a having a capacitance $C_{rx}$ is arranged in parallel with a load resistance 110a having a resistance $R_{ac,\,par}$. In FIG. 1b, a capacitor 108b having a capacitance $C_{rx}$ is arranged in series with a load resistance 110b having a resistance $R_{ac,\,ser}$.

Figure 2A:
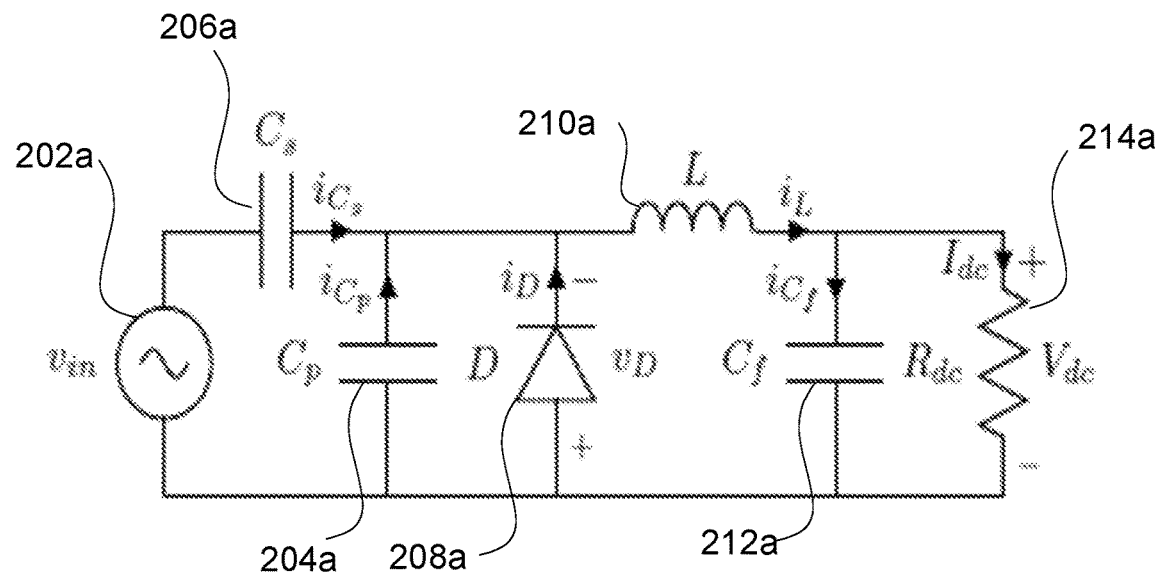
FIG. 2a depicts a circuit arrangement comprising a Class-E zero dv/dt rectifier. The rectifier depicted is a hybrid rectifier.
Figure 2B:
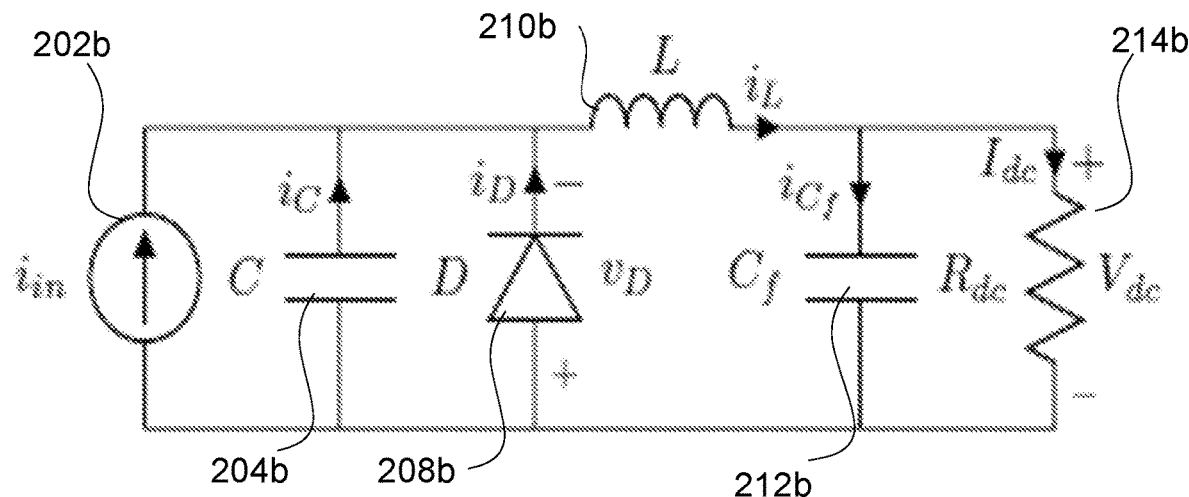
FIG. 2b depicts a circuit arrangement comprising a Class-E zero dv/dt rectifier. The rectifier depicted is a current-driven rectifier.
Figure 2C:
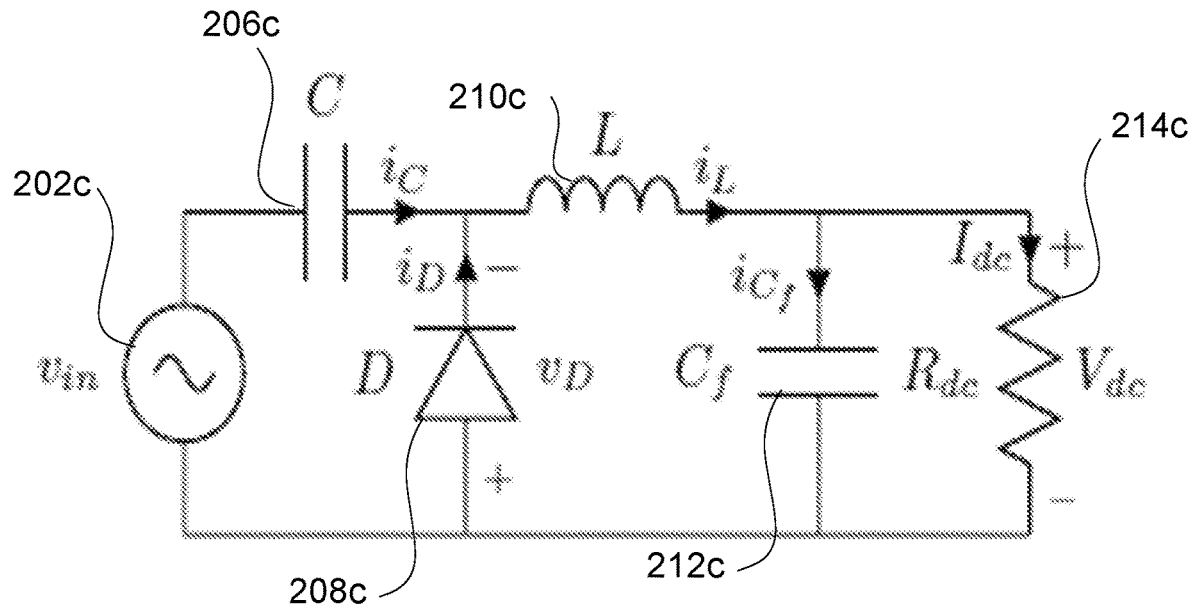
FIG. 2c depicts a circuit arrangement comprising a Class-E zero dv/dt rectifier. The arrangement shown is a voltage driven rectifier with a series capacitor.
Figure 2D:
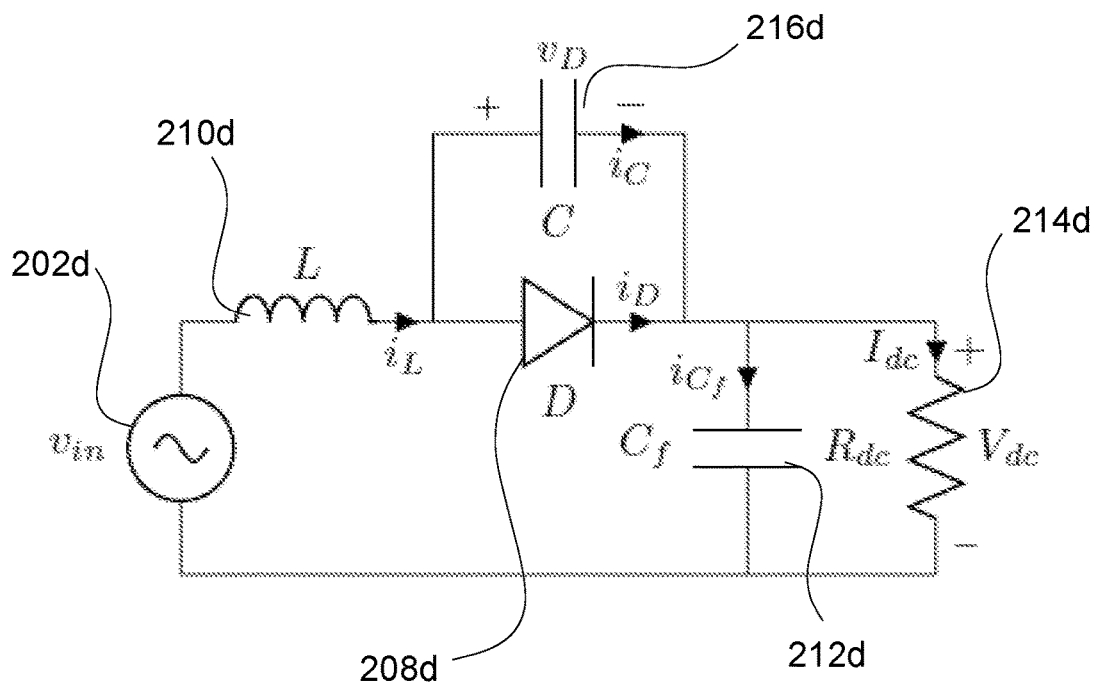
FIG. 2d depicts a circuit arrangement comprising a Class-E zero dv/dt rectifier. The arrangement shown is a voltage driven rectifier with a series inductor.

Throughout FIGS. 2a-d, like numerals refer to like components. FIGS. 2a-d show hybrid and conventional Class-E half-wave zero dv/dt rectifiers. FIG. 2a shows a hybrid rectifier (HVDR). FIG. 2b shows a current-driven rectifier (CDR). FIG. 2c shows a voltage driven rectifier with a series capacitor (series-C VDR). FIG. 2d shows a voltage driven rectifier with a series inductor (series-L VDR). The skilled person will appreciate the arrangement of the depicted components from the figures.

The topology shown in FIG. 2a is a new topology: a hybrid Class-E rectifier. The hybrid Class-E rectifier combines the properties of the voltage driven Class-E rectifier with a series capacitor, and the current driven Class-E rectifier. However, the parasitic effects of the diode negatively affect the properties of the circuit. This beneficial combination of properties is achieved, and the parasitic capacitance of the diode is mitigated, by adding an external capacitor $C_p$ across the diode. Capacitor $C_p$ to absorb the parasitic capacitance of the diode, as in the current driven rectifier, while having a series capacitance ($C_s$) between the input voltage source and the rest of the circuit, as in the voltage driven Class-E rectifier with a series capacitor.

In FIG. 2a, the depicted rectifier is powered by an AC input voltage 202a. The input voltage 202a supplies an AC signal to the rectifier. In IPT implementations, the input voltage could be supplied by a receiver coil, which is arranged to receive a signal from a transmitter coil. In operation as part of an IPT system, a receiver coil receives power from a transmitter coil and thus acts as a source of AC voltage for the rectifier circuit.

The arrangement shown in FIG. 2a also comprises an inductor 210a having an inductance L, and a DC load 214a having a resistance $R_{dc}$. $V_{dc}$ represents the DC output voltage across the DC load 214a. A filter capacitor 212a having a capacitance $C_f$ is placed across the output resistance 214a.

In the HVDR of FIG. 2a, a first capacitor 206a is coupled to the input voltage source 202a, and a second capacitor 204a is placed across a diode 208a. The first capacitor has a capacitance $C_s$. The second capacitor has a capacitance $C_p$. Thus, the capacitance C of the system is split into $C_s$ and $C_p$. Since an external capacitor is arranged across the diode 208a, the capacitance $C_{pn}$ of the diode 208a can be physically absorbed by $C_p$.

The hybrid class-E rectifier can emulate any input AC resistance for any given DC resistance ($R_{dc}$) based on a variable B. Variable B is defined as the ratio of $C_p$ to $C_s$. To achieve the emulation, variable B should be greater than 0 and can go up to infinity. This property can be achieved with either a synchronous or non-synchronous rectifier.

The arrangement shown in FIG. 2b is a current-driven rectifier. The rectifier is structurally similar to the hybrid rectifier depicted in FIG. 2a, however capacitor 204a is not present, and the input voltage is replaced by an input current 202b.

The arrangement shown in FIG. 2c is a voltage driven rectifier with a series capacitor 206c having a capacitance C. The rectifier is structurally similar to the hybrid rectifier depicted in FIG. 2a.

The arrangement shown in FIG. 2d is a voltage driven rectifier with a series inductor 210d. The inductor 210d is coupled to an input voltage 202d. The inductor 210d is also coupled to a diode 208d. A capacitor 216d is arranged across the diode 208d. The arrangement shown, outputs a DC voltage $V_{dc}$ which is output across an output resistance 214d. A filter capacitor 212d having a capacitance $C_f$ is arranged across the output resistance 214d.

As $A_r$ is increased above 2, the current in the semiconductor must be able to flow in both directions. This is because, as the resonant frequency of the L-C network in the rectifiers (or L-$C_s$-$C_p$ network for the hybrid rectifier) is greater than the operating frequency in these arrangements, the magnitude of the current harmonics (current waveforms of greater frequency than the operating frequency) can be greater than in the case where the resonant frequency would have been smaller than two times the operating frequency (i.e. $A_r$<2). As the magnitude of the current harmonics is now higher, the current through the transistor has oscillations that would result in a bidirectional current. These oscillations have a frequency approximately 1.5 times the operating frequency.

Hence, in embodiments which operate with an $A_r$ greater than 2, a transistor may replace the diode 208a-d. Typically, when a diode is used in the circuit, the rectifier may operate as a non-synchronous rectifier, and an $A_r$ in the range of 1.75 to 2 may be used. When a transistor replaces the diode, the rectifier may operate as a non-synchronous rectifier, and an $A_r$ in the range of 2 to 3 may be used. However, it will be appreciated that the substitution of the diode for a transistor in the $A_r$ range of 1.75 to 2 is optional.

FIGS. 8a to 8d show a hybrid synchronous Class-E rectifier, a current driven synchronous Class-E, a voltage driven series-C synchronous Class-E rectifier and a voltage driven series-L synchronous Class-E rectifier respectively. As will be appreciated, these circuit arrangements are similar to those shown in FIGS. 2a-d, with a diode 208 being replaced with a transistor 808. These circuits can be used across the full range of $A_r$, from 1.75 to 3. In FIGS. 2a-d and FIGS. 8a-d, like reference numerals are used for structurally and/or functionally similar circuit components.

As the skilled person will appreciate, conduction losses in a transistor are generally lower than in a diode when the semiconductors of these components conduct the same current. This is due to the forward voltage drop across the diode. A transistor does not experience this type of conduction loss, since its current conducting capability is controlled by an external signal. The external signal may be provided, for example, by a gate drive circuit. The gate drive circuit typically comprises further transistors which are capable of providing the required amount of charge to the gate capacitance of the transistor of the power circuit. The transistors within the gate drive circuit are controlled by a digital, i.e. small, signal, which could be provided by, for example, a microcontroller. Gate drive circuits are commercially available circuits and come in different packages, with different charging capabilities (e.g. speed for the delivery of a specific amount of electric charge).

While operating in the MHz region, the external signal could consume higher power than that required to forward bias the diode. However, modern transistor technologies achieve MHz switching with insignificant power requirement for the control signal.

Furthermore, since a transistor can be controlled by an external signal, an advantage of synchronous rectification is the ability of the circuit to regulate either the output voltage or the output current by varying the parameters of the external control signals. In the case of synchronous Class-E rectifiers, such parameters include the time of conduction of the transistor within one operating frequency (i.e. the duty cycle) and the phase between the control signal and the input source of the rectifier (i.e. the phase angle). Another advantage of having $A_r$ greater than 2 is that the variation in duty cycle with output load variation becomes smaller than the variation in duty cycle when $A_r$ is between 1.75 and 2.

There are two operating modes for synchronous rectification when $A_r$ is greater than 2, that are differentiated based on the phase angle between the control signal of the transistor and the input AC source. In the first, the phase angle is variable and changes such that zero voltage and zero derivative switching will be achieved during the turning off of the transistor. In the case of the non-synchronous rectifier, because the diode does not conduct current when the voltage across it is negative, the phase angle varies inherently with output load and zero derivative switching always occurs independent of the load.

In the second and preferred operating mode, the rectifier is a synchronous rectifier, wherein the phase angle is kept constant at a value where at 100% load the rectifier will achieve zero voltage and zero voltage derivative switching. By keeping the phase angle constant as the output load changes, zero voltage switching can be maintained. Zero derivative switching may be lost as the DC load decreases below 100%, however because the voltage at the point of switching is still zero, switching losses are still insignificant compared to the conduction losses. Being able to keep the phase angle constant in synchronous rectifier circuits is beneficial since external circuitry that would adapt the phase angle to the correct value based on the load is no longer required.

The properties of inherent voltage regulation and low input reactance deviation are still maintained as $A_r$ increases above 2, and in particular are maintained across the range of $1.75<A_r<3$. In fact, the error in inherent voltage regulation decreases below 5% as $A_r$ increases beyond 2, for both varying and constant phase angle operation.

Each of the arrangements shown in FIGS. 2a-d is designed to operate at an operating frequency. In the case of an IPT arrangement, the operating frequency may be determined by the frequency of the magnetic field generated at the transmitting coil. The frequency of the generated magnetic field is determined by the inverter driving the transmitting coil. In the case of any inverter, the frequency of the generated magnetic field is equal to the switching frequency of the transistor in the transmitting circuit.

As will be appreciated, each of the arrangements shown in FIGS. 2a-d, have a resonant network. Resonant network include LC networks. In FIGS. 2a-d, the resonant network is comprised of a capacitance C, and an inductance L. In FIG. 2a, the capacitance C is provided by capacitors 206a and 204a. The inductance is provided by inductor 210a. These components can be chosen to give different L and C in order to tune the resonant frequency to, of the network.

The resonant frequency is defined as the frequency at which L and C will have the same reactances. The reactance of L equals to $\omega L$ and the reactance of C equals to $1/(\omega C)$. The physical meaning of resonance is the phenomenon where all the energy stored in the magnetic field of the inductor is transformed into electric energy stored as electric field in the capacitor.

In embodiments of the present disclosure, the circuit is designed such that the ratio of the resonant frequency of the Class-E rectifier to the operating frequency of the circuit is preferably in the range 1.75 to 3.

In IPT applications, the input of the rectifier circuit, 202a-d, may be a receiving coil. The receiving coil may be a ferrite core coil, or an air core coil. Air core coils may be described as any inductor which does not rely on a ferromagnetic material to operate. Air core coils in an IPT system can be described as 'weakly coupled', because the achievable magnetic coupling between coils is relatively low when compared to inductive links that utilize e.g. ferrite in their coils. The term air core coil may describe inductors having a conducting coil comprised, for example, of wire, and which has air inside the turns of wire. Inductive links with air core coils are more robust to coil misalignments and can operate at greater gaps than links with, for example, ferrite core coils. Furthermore, air core coils are cheap and light as they do not use ferrite. Air core coils are also more reliable as there are no effects of ferrite degradation. However, it will be appreciated that the presently disclosed arrangement is beneficial for any type of coil.

Class-E zero dv/dt rectifiers, as shown in FIGS. 2a-d, use a capacitor having a capacitance C, or a capacitive network of total capacitance C, to achieve zero rate of change of the voltage across a diode when it is reverse biased. An inductor having an inductance L is used for the circulation of the DC load current when the diode is forward biased. It is possible to describe the operation of Class-E rectifiers according to a variable $A_r$, defined as the ratio of the resonance frequency of the LC network ($\omega_r$) to the operating frequency ($\omega$). The operating frequency is the frequency of the input AC source. Where $\omega_r$ equals to $\omega$, $A_r$ is equal to unity, and the rectifier is therefore operating at resonance.

In the Class-E rectifiers of FIG. 2a-d, the inductor, L, functions as a filter inductor and, in operation, has a large harmonic distortion in the current through it ($i_L$). When the diode is forward biased, one end of the inductor can be clamped to ground, causing a constant rate of discharge of $C_f$ through L. When the diode is reverse biased, $i_L$ has a sinusoidal component superimposed to the output DC current. The magnitude of the AC component of $i_L$ increases with $A_r$. When $A_r$ approaches zero in operation above resonance, the current through L can be assumed to be DC.

As is known to the skilled person, the source of a network is the part of the network that provides or transmits power, and the load is the part of the network which consumes power. In the arrangements shown in FIGS. 2a-d, the input sinusoidal source of the rectifiers may be the output of a resonant tank. The resonant tank can be either the receiving end of an IPT system (e.g. $L_{rx}$-$C_{rx}$ of FIG. 1) or it can be part of the output network of an inverter. In the latter case the rectifier will be directly connected to the inverter forming a resonant DC to DC converter.

Prior Class-E rectifiers have been designed to exhibit a resistive input impedance due to a requirement by further inductor-capacitor networks added in the circuit to compress the load seen by the inverter as the output DC load varies. A resistive input impedance was thought to be necessary because designing a circuit with a resistive input impedance means that, for a perfectly tuned coil, there will be no exchange of reactive power across the link. Any exchange of reactive power will result in higher currents in the coils for the same real power delivered to the load and therefore more losses.

However, in arrangements of the present disclosure it has been appreciated that the input impedance does not have to be purely resistive. To ensure high efficiency, the presence of that extra reactance can be compensated for, and the circuit can be designed such that the extra reactance does not deviate at variable loads and its deviation does not detune the receiving coil of the IPT or the resonant tank in a resonant converter.

A first problem in the operation of known circuits is the variation of the input impedance of the Class-E rectifier as the output DC resistance changes, e.g. due to a change in the state of charge of a battery powered directly by the rectifier.

The resistive input impedance property of a Class-E rectifier is valid for a specific output DC load ($R_{dc}$). As the output DC load changes the input impedance of the rectifier may also be changed such that it is no longer resistive. This affects other parts of the system, for example the inverter or the inductive link and the transmitting end in the case of an IPT system. In IPT and resonant power converter applications, the incorporated resonant tanks need to remain unaffected. In the case of an inductive link, this is particularly important because the resonant tank at the receiving end must always be in resonance at the frequency of operation such that optimal link efficiency conditions can be met. In the case of a resonant converter, the resonant tank must not be detuned, otherwise optimal soft switching conditions for the utilized utilised inverter are lost, causing system efficiency to be negatively affected.

One method which attempts to solve the problem of input reactance variation with DC load is the addition of a DC/DC converter after the rectifier. The external DC/DC converter provides a constant load for the rectifier, and hence keeps its input impedance, and thus its input reactance, constant at all times. However, this method is unsatisfactory as it requires the addition of an extra power conversion block in the system. The efficiency of the added DC/DC converter will reduce the efficiency of the complete system while increasing the cost of the system.

Another method which attempts to solve the problem of input reactance variation with DC load is to modify the inverter such that the variation of the reactance of the rectifier does not affect the soft switching operation of the inverter. However, this method is also unsatisfactory as it requires the addition of external circuitry that not only increases both the cost and the size of the inverter, but also reduces the efficiency of the system.

A second problem in the operation of known circuits is the regulation of the output voltage of the system.

In general, a rectifier circuit will provide power to a specific load, such as a battery or a drive rotating the motor of an electric vehicle. It is common for the rectifier to have a requirement to regulate any of the voltage, current or power that is supplied to the load. Because the diode in the rectifier circuit cannot be controlled by an external signal, the controlled signal is applied to the transistor. In the pulse-width-modulated (PWM) DC/DC converters (e.g. buck, boost, forward converter) any type of regulation at the output is achieved by varying the width of the pulse that defines the conduction time of the transistor in the circuit, hence the name given to these converters.

However, in resonant converters utilizing soft-switching topologies, such as Class-E inverters/rectifiers, pulse width modulation is not common because the behavior of the circuit with duty cycle is difficult to be predicted. Simpler methods of control are applied that essentially stop and initiate the transmission of power from one end of the system to the other based on the output voltage value. This method of control, while simple, requires energy storage components at the output that are able to provide power at the output when no power is transferred to the rectifier. Energy storage components are volume consuming, increasing therefore the physical size and weight of the system.

For a successful Class-E rectifier integration in an IPT system, the input resistance of the topology should be set to an optimal value based on the configuration of the inductive link. It is mathematically convenient to represent the input impedance of the voltage driven Class-E rectifiers as the parallel connection of a reactive component, $X_{in,p}$, and the input resistance, $R_{in,p}$. On the other hand, in the current driven topology it is more convenient to present the input impedance by a series combination between $X_{in,s}$ and $R_{in,s}$. When Class-E rectifiers are designed to provide optimal link efficiency conditions, designers can select the duty cycle, $d_r$, at full load and variable $A_r$:

$$A_r = \frac{\omega_r}{\omega} \tag{4}$$

The choice of 50% duty cycle at full load tends to provide maximum power output capability ($cp_{dc}$) in Class-E rectifiers. In the case of the HVDR (FIG. 2a) another degree of freedom is introduced in the selection of variable B defined as:

$$B = \frac{C_p}{C_s} \tag{5}$$

where the sum of the two capacitances is:

$$C = C_w + C_y \tag{6}$$

The passive components in the circuit are then evaluated such that the specified conditions are met.

The duty cycle depends on the loaded quality factor ($Q_r$) of the rectifier, defined as:

$$Q_r = \frac{R_{dc}}{X} \tag{7}$$

where $R_{dc}$ is the rectifier's DC load and X is the reactance of the series component in the voltage driven topologies (L or C) or in the current driven topology, X is the reactance of capacitor C. The relationship between the DC resistance with the input resistance in the voltage driven rectifiers (assuming 100% efficiency) is given by:

$$R_{dc} = 2M_v^2 R_{in,p} = 2M_v^2 R_{ac,par} \tag{8}$$

where $M_V$ is the ratio of output voltage to the peak of the AC input voltage (AC to DC voltage gain). In the current driven topology, $R_{dc}$ is given by:

$$R_{dc} = \frac{R_{in,s}}{2M_I^2} = \frac{R_{ac,ser}}{2M_I^2} \tag{9}$$

where $M_I$ is the ratio of output current to the peak of the AC input current (AC to DC current gain). In order to directly relate the input AC resistance to the required X value, (8) and (9) are substituted into (7) and the variables are rearranged such that an expression is formed relating the ratio of the AC resistance to the required X value. This ratio will be called input loaded quality factor, $Q_{in}$, and is given by the following expressions:

$$Q_{in} = \frac{Q_r}{2M_v^2} = \frac{R_{in,p}}{X} \tag{10}$$

for the voltage driven topologies and:

$$Q_{in} = 2M_I^2 Q_r = \frac{R_{in,s}}{X} \quad (11)$$

for the current driven topology. Using the definition of variable $A_r$, the relationship between the reactances forming the LC network is given by:

$$A_r^2 = \frac{X_C}{X_L} \quad (12)$$

In the case of the HVDR, $C_s$ and $C_p$ are evaluated from (5), (6) and (12). Finally, the ratio of input reactance to X is given by:

$$N_{in} = \frac{X_{in}}{X} \quad (13)$$

In the mathematical analysis of each rectifier, the diode and passive components were assumed ideal and lossless.

The design variables in (7)-(11) and (13), for the Class-E topologies are presented in FIG. 3a-c and FIG. 4 as functions of $A_r$ for duty cycle values from 50% to 10%, in steps of 10%. In FIG. 5 the design variables are illustrated as functions of $A_r$ for several values of B at 50% duty cycle for the HVDR. The loaded quality factor ($Q_r$) is independent of variable B and is therefore the same for the HVDR (FIG. 2a) and the series-C VDR (FIG. 2c). Also, Qr in the CDR (FIG. 2b) is the same as in HVDR and the series-C VDR since CDR forms the Norton equivalent circuit of the series-C VDR.

The CDR (FIG. 2b) is the most commonly implemented topology of the conventional half-wave Class-E rectifiers. However, a crucial property of the topology has been missed in the prior art, because as can be seen for $N_1$ in FIG. 3a, an $A_r$ between 1.75 to 2 has the advantage of keeping the input reactance of the topology, $X_{in,s}$, less than 5% from its initial value as the duty cycle decreases below 50% as a result of increasing $R_{dc}$. Hence, the CDR will not significantly detune the receiving coil because it will not introduce a large residual reactance compared to the reactance of $L_{rx}$, as $R_{dc}$ increases.

In the same $A_r$ range (1.75 to 2) unlike $X_{in,s}$ the input resistance ($R_{in,s}$) of the topology will change with duty cycle. From the definition of $Q_{in}$ and by considering the behavior of duty cycle with $R_{dc}$, the input resistance of the topology decreases as $R_{dc}$ increases. This behavior of $R_{in,s}$ provides an inherent output voltage regulation assuming a constant input current. The inherent output voltage regulation can be observed by multiplying $M_I$ and $Q_r$. From the definitions of the two variables, their product gives a direct relationship between the input current and the output voltage: $V_{dc}/(X_C \cdot i_{in})$. By evaluating the product of the curves in FIG. 3a with the curves in FIG. 3c it can be observed that there is an insignificant deviation from the initial value of this product as the duty cycle decreases below 50%. In fact the inherent voltage regulation actually occurs over a range of $A_r$ from 1.6 to 2.

Figure 3A:
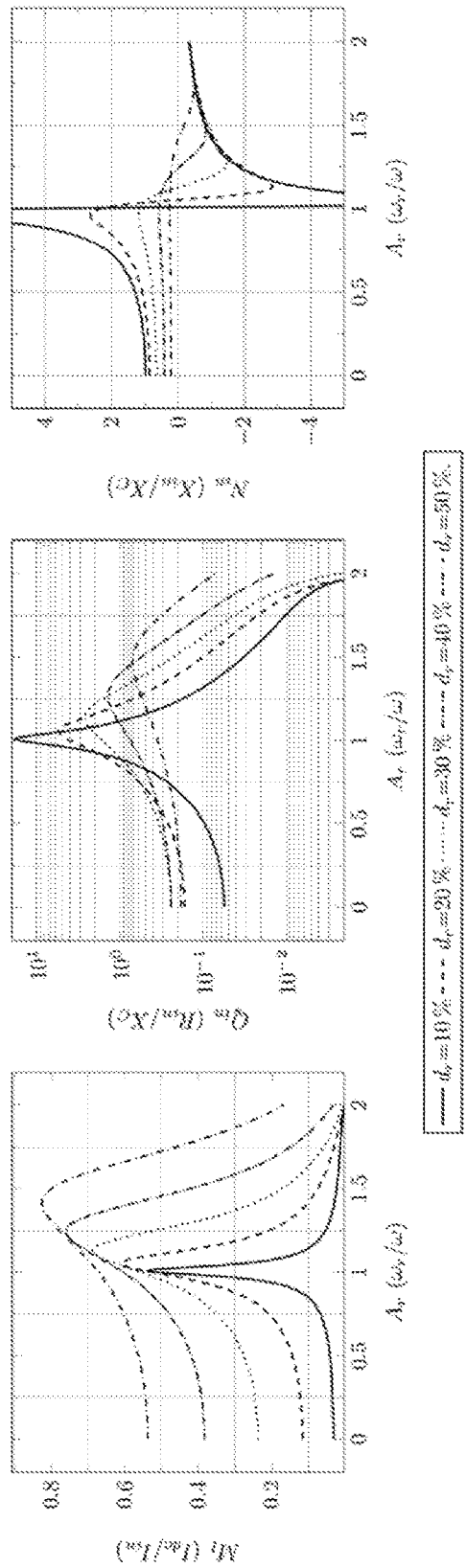
FIG. 3a depicts the variation of design variables for a current driven rectifier as shown in FIG. 2b.

In resonant operation, a monotonic behavior of the input resistance of the topology can be observed in $Q_{in}$ of FIG. 3a. $R_{in,s}$ increases with $R_{dc}$. Inherent output voltage regulation can exist in resonant operation by keeping the induced emf in the receiving coil constant. However, the error in output voltage regulation is more difficult to find in this case without considering the value of the external capacitor added for the tuning of the receiving coil and the system is not as well regulated as in operation at an $A_r$ between 1.6 and 2.

Finally, when the topology is designed at an $A_r$ that tends to zero the resultant inductance value (L) is large. This can be deduced from $Q_{in}$ of FIG. 3a and (12). A high inductance results in an inductor current (iL) with a small AC component. This small AC component eases the implementation of the output filter capacitor ($C_f$).

Turning to the series-L VDR (FIG. 2d), the series-L VDR will generally introduce implementation challenges because the required inductance L will need to be in the µH range for most practical inductive links. Using the definition of $Q_{in}$ in the series-L VDR, it can be shown that the ratio of L to $L_{rx}$ will be greater than unity when $A_r$ is greater than 0:5. Realizing these values of inductance requires a magnetic core which will be prohibitively lossy at MHz frequencies.

Turning to Voltage Driven Class-E Rectifier with Series Capacitor (series-C VDR), this topology (FIG. 2c) can be thought as the voltage driven equivalent of the CDR (FIG. 2b) and therefore, it exhibits the same input impedance behavior with $A_r$. As $A_r$ tends to zero a large L results from the design variables which eases the implementation of $C_f$. In resonant operation ($A_r$ is one), a monotonic behavior of the input resistance of the topology ($R_{in,p}$) can be observed in of FIG. 4b (centre). $R_{in,p}$ decreases as $R_{dc}$ increases and hence, as observed in the CDR (FIG. 2b), the equivalent series resistance seen by $L_{Rx}$ increases with $R_{dc}$ resulting in inherent output voltage regulation when the induced emf is constant.

Figure 3B:
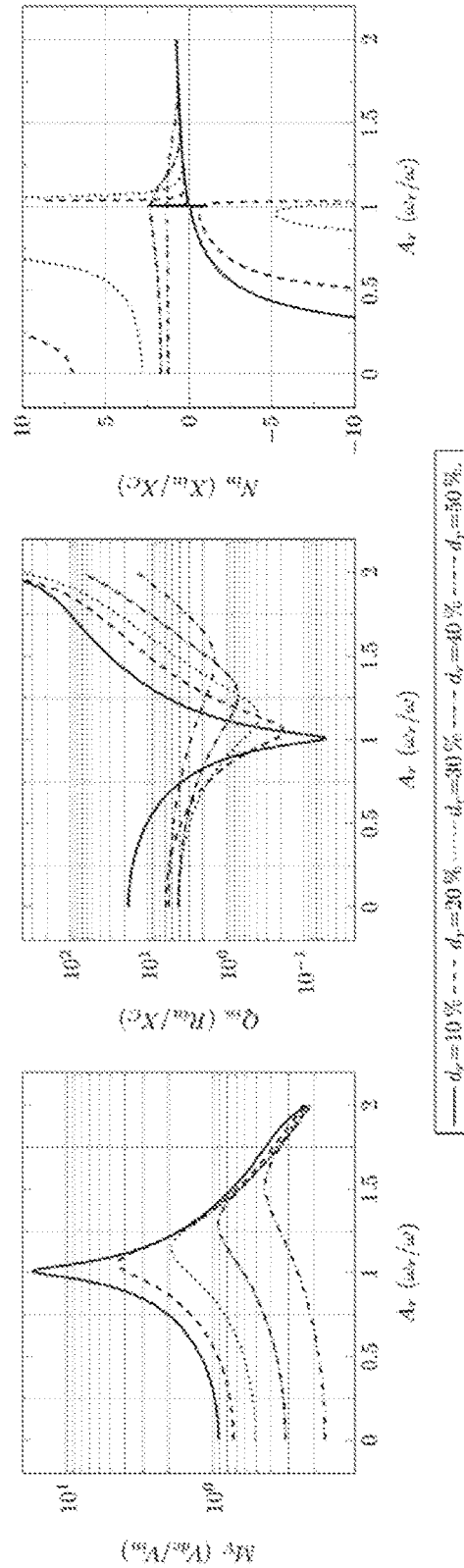
FIG. 3b depicts the variation of design variables for a voltage driven rectifier as shown in FIG. 2c.

From Nin in FIG. 3b, it can be shown that the property of low input reactance ($X_{in,p}$) deviation with increasing $R_{dc}$ occurs over the same $A_r$ range as the CDR (from 1.75 to 2). Furthermore, the inherent output voltage regulation at the aforementioned $A_r$ range can be observed in MV of FIG. 3b. In the $A_r$ range from 1.75 to 2, MV changes insignificantly from its initial value as $R_{dc}$ increases. Hence, by keeping constant the voltage across the input terminals of the rectifier the output voltage will be regulated. In an IPT scenario the input voltage of the rectifier is the voltage across the tuning capacitor and will be kept constant by keeping constant the current in the receiving coil (as in the CDR). $R_{in,p}$ is an order of magnitude greater than $X_{in,p}$ to satisfy the optimal link efficiency conditions, therefore the magnitude of the voltage at the input terminals of the rectifier is primarily dependent on $X_{in,p}$. As $X_{in,p}$ remains within 5% of its initial value at this $A_r$ range, at a constant iLrx the voltage across the input terminals of the rectifier remains constant.

In contrast to the other rectifier topologies, the operation of the series-C VDR is highly dependent on the output power level because the non-constant diode junction capacitance (Cpn) is not absorbed into a large fixed capacitor. Therefore, the HVDR (FIG. 2a) can be seen as an improvement to the series-C VDR because Cpn can be absorbed into Cp. Hence, the HVDR is more robust to changes in output voltage than the series-C VDR and introduces an additional degree of design freedom in the selection of variable B, which allows the provision of optimal load for a desirable $A_r$.

Finally, turning to the Hybrid Class-E Rectifier (HVDR), the behavior of MV, and $X_{in}$ variables over $A_r$ and dr in both the HVDR (FIG. 2a) and the series-C VDR (FIG. 2c) is the same and hence, these two topologies share the advantageous properties discussed in the previous section. However, an additional important property of the HVDR (FIG. 2a) can be observed by considering the AC to DC gain (MV). In this topology MV depends on two variables, $A_r$ and B. The series-C VDR does not have this property because it does not split C into two components. By selecting the appropriate $A_r$ and B combination, the topology can be used to match the optimal AC load of an inductive link to any given value of $R_{dc}$ to be powered by the IPT system. Furthermore, different HVDR topologies can present the same AC load while having the same $R_{dc}$ but with different values of the other passive components. It should be noted that for $A_r$ greater than 1:7, the input capacitance of the HVDR can become greater than Crx.

For the purposes of better illustrating the present concepts and findings, the results of an examination of five different rectifier designs will now be discussed and presented.

Design #1: HVDR operating at an $A_r$ smaller than one providing a low AC current ripple through the output filter capacitor.

Design #2: HVDR operating at resonance ($A_r$=1) and exhibiting a monotonic behavior in its input resistance with varying $R_{dc}$.

Design #3: HVDR operating at the maximum power output capability ($cP_{dc}$) point of FIG. 6 ($A_r$=1.52).

Design #4: HVDR operating at an $A_r$ equal to 1.75, exhibiting a low deviation input reactance and a monotonic behaviour in input resistance with varying $R_{dc}$.

Design #5: CDR with the same input impedance properties as Design #4 ($A_r$=1.8).

The four HVDR designs were implemented with a different combination of $A_r$ and B to investigate which combination of LC network components will deliver the best efficiency and the required input resistance for the same $R_{dc}$. All the HVDR designs had the same MV, except Design #4, since B has to be evaluated to yield an input capacitance smaller than the tuning capacitance of Lrx. $A_r$ in the CDR (Design #5) was selected to also result in a circuit with $R_{dc}$ equal to the value for the other rectifiers.

For each design, the inductor (L) was implemented first. Based on its measured value the other passive components were chosen such that the initial selection of $A_r$ and B, or just $A_r$ for the CDR, was satisfied. All inductors were implemented with Micrometals iron powder cores for RF applications. Specifically, in Design #1 a T106-3 core was used and in Designs #2 to #5 T106-2 cores were used. All capacitors were from the AVX high Q range. Component impedance measurements were made with a Keysight Technologies impedance analyzer. All rectifiers utilized a single Wolfspeed SiC Schottky diode, the C3D10065A, which has 10 A forward current capability and 650V blocking voltage capability To allow careful characterization of rectifiers and to avoid the need of an inductive link and its associated instrumentation for testing the rectifier, a test rig was developed that reproduces IPT conditions in the tuned $R_x$ coil when a rectifier is added at the receiver. With this test rig calculation of the efficiency of the receiver ($\eta_{Rx}$) and the input resistance of the rectifier under test as seen from the output of the inverter, is possible without affecting any other part of the IPT system.

The five implemented rectifiers were compared with respect to their efficiency and their effect on the inductive link. To ensure repeatability of results, a power sweep was performed in each experiment and measurements were recorded twice, when the output power was increasing from minimum to maximum and when the output power was decreasing from maximum to minimum. The results presented are the average. The test rig enables measurement of the combined impedance of the receiving coil, external tuning capacitor and the rectifier under test. At resonance, this impedance is equal to the equivalent series input resistance of the rectifier, Rin;ser. In the current driven case, Rin;ser is equal to Rin;s and in the voltage driven case Rin;ser is equal to the series transformation of $R_{in;p}$. When the rectifier is designed to reflect the optimal load this Rin;ser value is equal to Rac;ser independent of series or parallel tuning (which is equal to 10:6 in this case study).

Figure 5A:
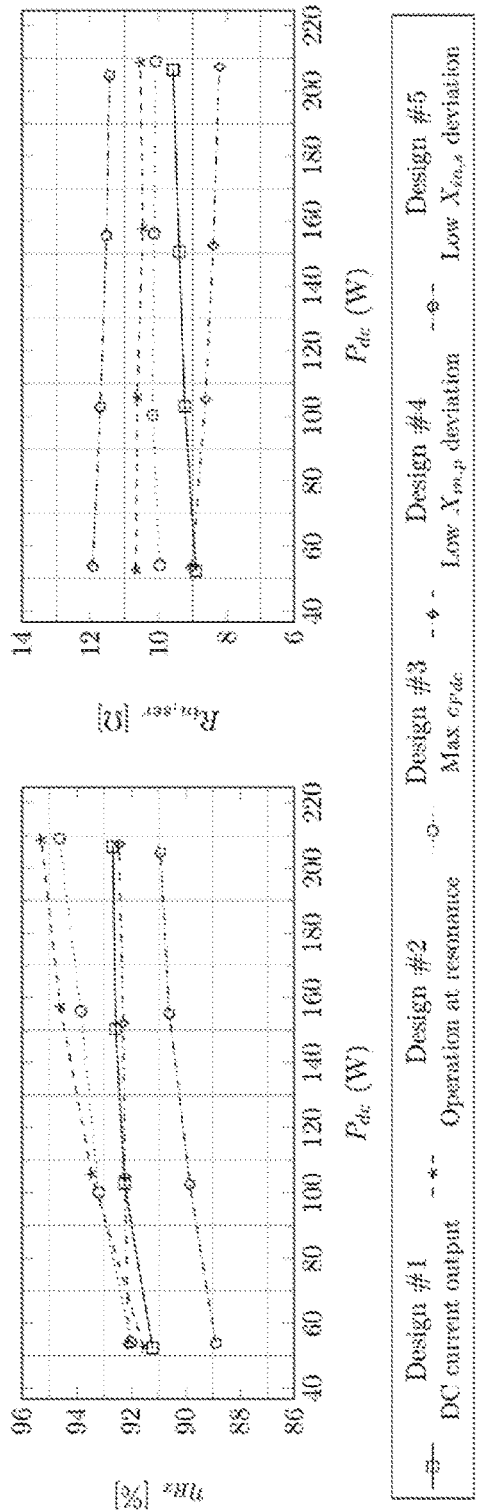
FIG. 5a shows the performance of different rectifier designs at a constant DC load resistance.
Figure 5B:
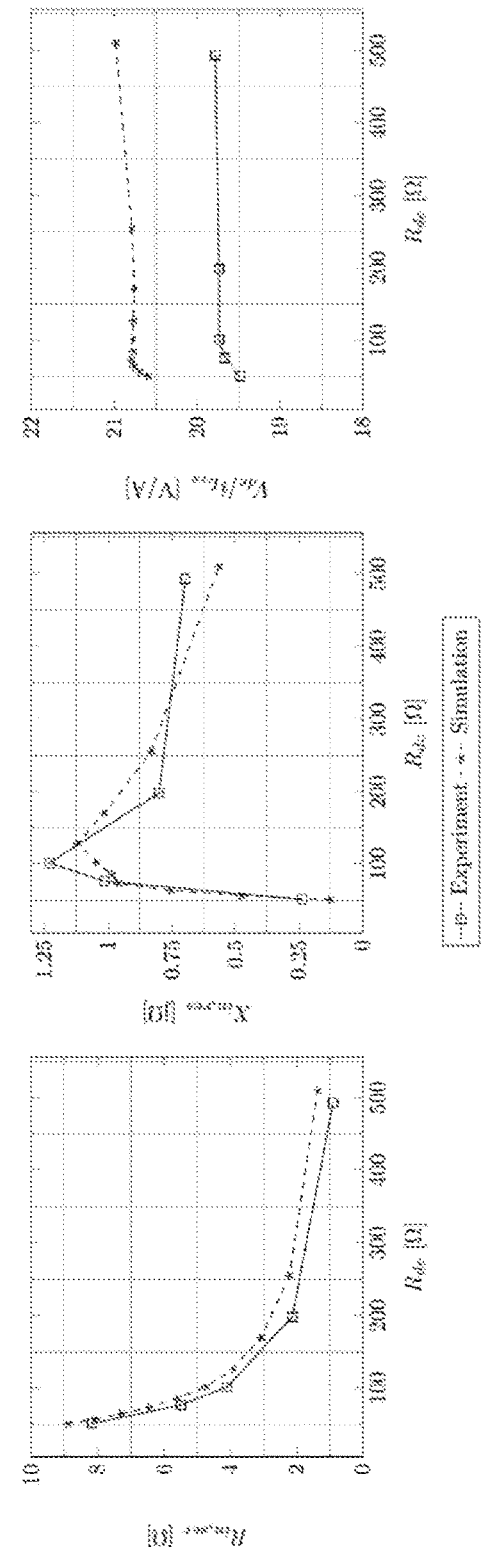
FIG. 5b shows a series input resistance and reactance of a rectifier in accordance with the present disclosure (design #4) at variable DC load.
Figure 5C:
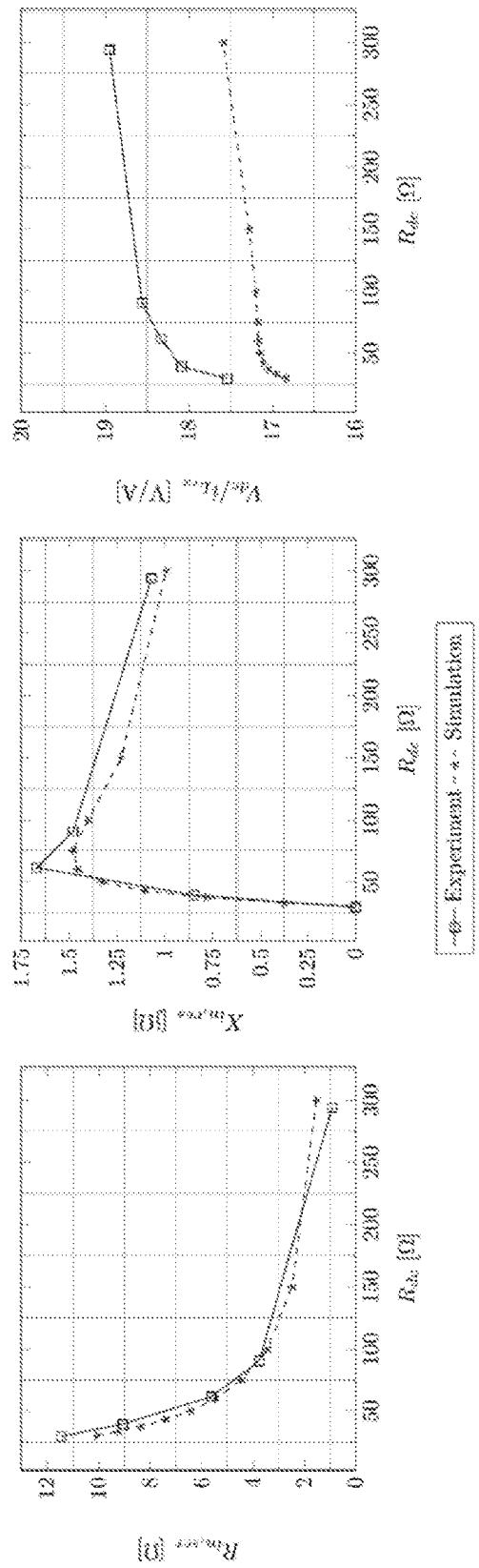
FIG. 5c shows a series input resistance and reactance of another rectifier according to the present disclosure (design #5) at variable DC load.
Figure 5D:
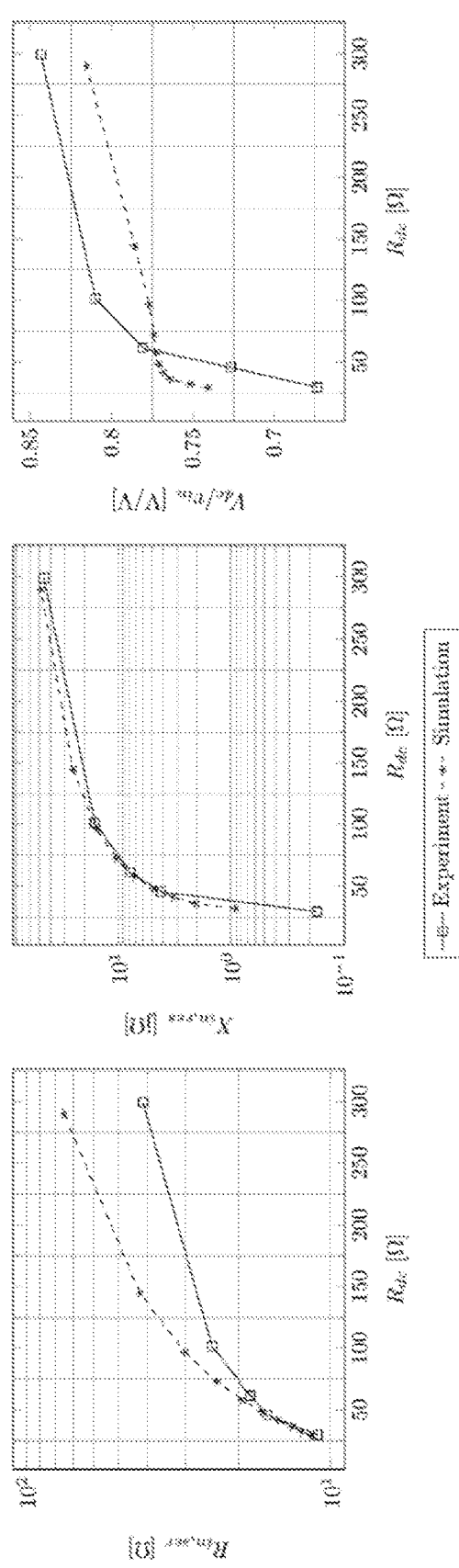
FIG. 5d shows a series input resistance and reactance of a rectifier (design #2) at variable DC load.

FIG. 5a presents the measured $\eta_{Rx}$ and $R_{in;ser}$ for varying power (50 W to 200 W). FIG. 5b, FIG. 5c and FIG. 5d show the results of the variable $R_{dc}$ experiments for Designs #2, #4 and #5 over a DC load range between 10% to 100%. At every DC load step, the $R_{in;ser}$ of the topology and the residual reactance at the resonant tank ($X_{in;res}$) were calculated. $X_{in;res}$ is the uncompensated reactance between the reactances of the Rx coil, the external tuning capacitor and the input reactance of the rectifier. To examine the inherent voltage regulation feature, the ratio between the output DC voltage to the current in the receiving coil ($V_{dc}/i_{in}$) was calculated in Designs #4 and #5 and in Design #2 the ratio between the output DC voltage to the amplitude of the presented emf ($V_{dc}/v_{in}$) was calculated. The experimental results are compared with time-domain SPICE simulations.

According to the plots in FIG. 5a, all designs showed low deviation in efficiency over the entire output power range. The worst case deviation in efficiency over $P_{dc}$ was in Design #2 and was 4%. Designs #2, #3 and #5 exhibited deviations in Rin;ser lower than 3% from the nominal value while Designs #1 and #4 exhibited deviations of 7:2% and 9:4% respectively. Design #1 had the lowest capacitance across the diode amongst the implemented rectifiers and is therefore more sensitive to the variation of pn junction capacitance. Design #4 on the other hand, although having a significantly higher Cp, is more sensitive to variations in XC than Design #1 due to the selection of $A_r$. A small variation in $A_r$, when it is greater than 1:6, will result in a large variation of and therefore in $R_{in;p}$. While Design #5, the current driven topology, operates in the same $A_r$ region as Design #4, its Rin.ser profile over output power has a much lower deviation than Rin;ser of Design #4. This is because the capacitance across the diode in Design #5 is twice the magnitude of the respective capacitance in Design #4.

Design #5 (the CDR) has the lowest $\eta_{Rx}$ because the losses in its L are the highest amongst the five designs. Since all the designs, apart from Design #4, have the same $R_{dc}$, the inductors (L) in Designs #1 to #3 and #5 experience identical voltage waveforms over a cycle. Thus, the highest inductor current amongst the designs occurs in Design #5 causing the highest losses. Comparing the HVDR circuits, Designs #1 to #4, the higher the presented Rin;ser the higher receiving end efficiency was achieved. In general all the developed rectifiers presented an error in their Rin;ser proportional to the error between theoretical and experimental values of $R_{dc}$. Error in the experiment is larger for solutions where the diode parasitic capacitance is significant compared to the external capacitance across the diode and where the sensitivity of to $A_r$ is large. Hence, the greatest error was observed in Designs #4 and #5.

FIGS. 5b & 5c show good agreement between simulation and experimental results. In simulations, the passive components were set equal to the measurements of the impedance analyzer. Designs #2, #4 and #5, performed as expected in that in Designs #4 and #5, Rin,ser decreased with $R_{dc}$ and in Design #2, Rin;ser increased with $R_{dc}$. In terms of input reactance variation, Designs #4 and #5 presented residual reactances at the receiving end with magnitude smaller than 1% of the impedance of the receiving coil, Xrx. Furthermore, in these two designs the output voltage was inherently regulated when the current in the receiving coil was kept constant. The output voltage was regulated within 3% and 8% of its initial value in Design #4 and in Design #5 respectively. Design #2 also exhibits some inherent output voltage regulation with a deviation of 25% for constant input voltage.

To investigate further how the implemented rectifiers affect the efficiency of the inductive link and the reflected impedance at the transmitting coil, the measured values of FIG. 5b and FIG. 5d were mapped on the contour plots of FIG. 6.

Figure 6C:
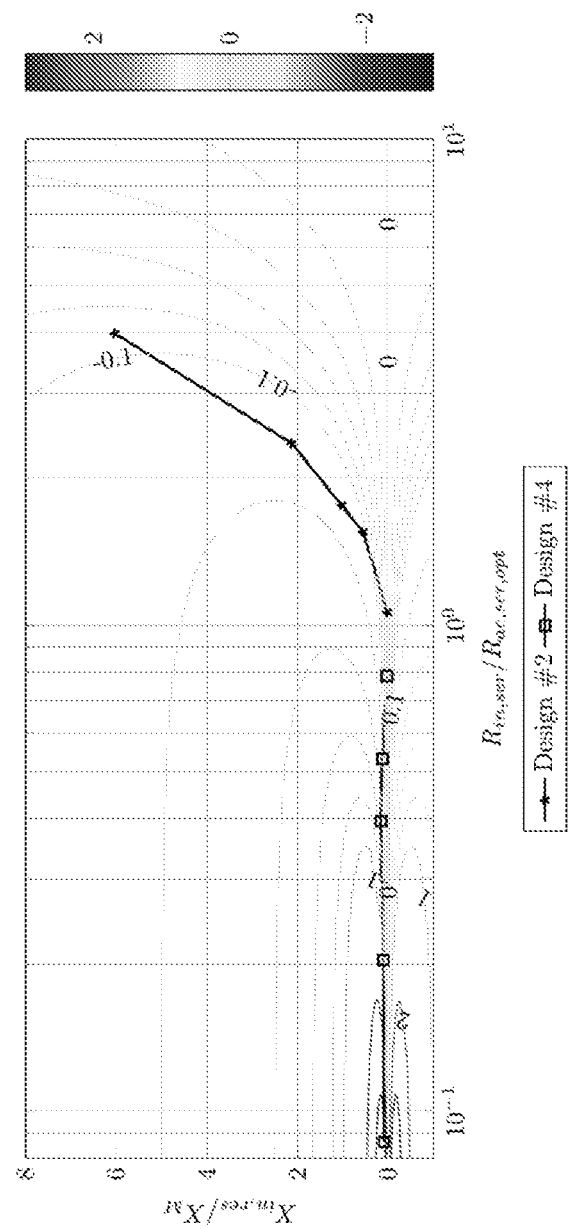
FIG. 6c shows experimental data, and in particular shows the experimental data shown in FIG. 5d mapped onto contours of link efficiency, reflected resistance to the transmitting coil, and reflected reactance to the transmitting coil. From 0 to 0.1 the contours appear in steps of 0.02, then from 0.1 to 0.2 in steps of 0.1, and then in step of 0.2.

FIGS. 6a, 6b and 6c show the contours of the inductive link efficiency ($\eta_{link}$), the reflected resistance at the transmitting coil (Rref), and the reflected reactance at the transmitting coil (Xref) respectively. All contours of FIG. 6 are plotted as functions of the normalized resistance seen by the receiving coil, Rin;ser/Rac;ser, and the normalized residual reactance at the resonant receiving tank, $X_{in}$;res/XM. Note that Rac;ser is the AC resistance at the receiving end that provides the optimal link efficiency and XM is the impedance of the magnetising inductance between the coils forming the inductive link (which is 7.11Ω at the frequency of operation). Moreover, the contours of $\eta_{link}$ and Rref are normalized to their respective optimal values. Finally, the contours of Xref are normalized to XM.

The trajectories of the normalized values of Rin;ser and $X_{in}$;res have been added to the contours plots of FIG. 6. Specifically, the experimental data of Designs #2 and #4 have been used as they both exhibit the desirable property of inherent voltage regulation for variable DC load and Design #4 also exhibits low deviation in input reactance with variation in DC load. As Design #5 behaves in the same way as Design #4 with regards to these parameters, only the data from Design #4 has been plotted in FIG. 6.

As shown in FIG. 6a, at 100% DC load all tested designs are within the $\eta_{link.opt}$ contour. As the load decreases down to 50%, all designs fall into lower efficiency contours but they are within 97% of the $\eta_{link.opt}$. Although Design #2 is detuning the receiving coil at DC loads lower than 100%, the resultant link efficiency is actually slightly higher than that for Design #4 for the same load value. This occurs because Rin;ser of Design #2 increases from its initial value, rather than decreases as in the case of Design #4, where the link efficiency is more tolerant to the presence of residual reactance, as shown in the contours of FIG. 6a. At DC loads lower than 20%, the link efficiency in both designs falls below 90% of $\eta_{link.opt}$, however the losses in the inductive link would be smaller in magnitude than the losses when maximum power is transferred at $\eta_{link.opt}$.

In FIG. 6b and FIG. 6c, the reflected impedance at the transmitting coil behaves inversely to the input impedance of the utilized rectifier. This is a basic property of inductive links. In Design #2, $R_{ref}$ decreases linearly as $R_{dc}$ increases. On the other hand, in Design #4, $R_{ref}$ increases linearly as $R_{dc}$ increases. In terms of reflected reactance ($X_{ref}$), in Design #2 the reflected reactance does not increase beyond 0:15 times $X_M$, despite the residual reactance at the receiving coil reaching six times $X_M$. Comparing the magnitude of $X_{ref}$ for Design #2 to the impedance of the transmitting coil ($X_{Tx}$), $X_{ref}$ is always lower than 1% of $X_{Tx}$ and will not affect the tuning of the Tx coil. On the contrary, while Design #4 does not introduce $X_{in;res}$ greater than 25% of $X_M$, the $X_{ref}$ for this design increases with $R_{dc}$ and can reach almost three times the magnitude of $X_M$.

The inherent output voltage regulation feature can be achieved in both Design #2 and Design #4. For Design #2 a constant output current at the $T_x$ will result in a constant induced voltage in the $R_x$ coil, thus providing the condition for the output voltage regulation feature. In Design #2 the transmitting resonant tank will not be affected by the variation of $R_{dc}$. Hence, since Rref decreases with $R_{dc}$, a constant output current Class-EF inverter will be compatible. In Design #4, inherent output voltage regulation occurs with a constant current in the $R_x$ coil. This requires the variation of the magnitude of the induced voltage in the $R_x$ coil and hence, the variation in the current in the $T_x$ coil. Since the reflected impedance increases with $R_{dc}$ a Class-D ZVS constant output voltage inverter will be capable to provide the conditions for inherent output voltage regulation It will be understood that the above description of specific embodiments is by way of example only and is not intended to limit the scope of the present disclosure. Many modifications of the described embodiments, some of which are now described, are envisaged and intended to be within the scope of the present disclosure.

Class-E rectifiers of the type described herein can be used in any type of circuit that makes use of a resonant tank, for example wireless power applications including those which utilise inductive power transfer but also RF applications. Rectifiers of the type described herein may also be used within resonant power DC/DC converters, meaning they can in fact be used within any DC/DC converter application.

In the case of an IPT system power throughput control and inherent voltage regulation will be achieved when the transmitting coil is driven by a Class-D inverter (and particularly the zero-voltage Class-D inverter for maximum efficiency) since the resistance to the transmit coil increases with increasing the load resistance. A Class-D inverter is shown in FIG. 13. As the load reflected at the transmitting coil increases with the output DC load of the rectifier ($R_{dc}$) a constant output voltage inverter is required such that the magnitude of the input source of the rectifiers remains constant. In the IPT case the magnitude of the input source of the rectifier is dependent upon the current in the receiving coil. With a constant magnitude source for the rectifier the aforementioned rectifier properties can be applied.

In the case of resonant DC/DC converter applications inherent output voltage regulation will be achieved if a load-independent Class-EF inverter is used in combination with any of the Class-E rectifiers of FIGS. 2a-d when the rectifiers are designed with an $A_r$ between 1.75-2. Because the inverter has a constant current output, the magnitude of the input source of the rectifier will remain constant and from the low input reactance deviation and monotonic input resistance properties of the Class-E rectifiers voltage regulation will be possible.

Figure 7:
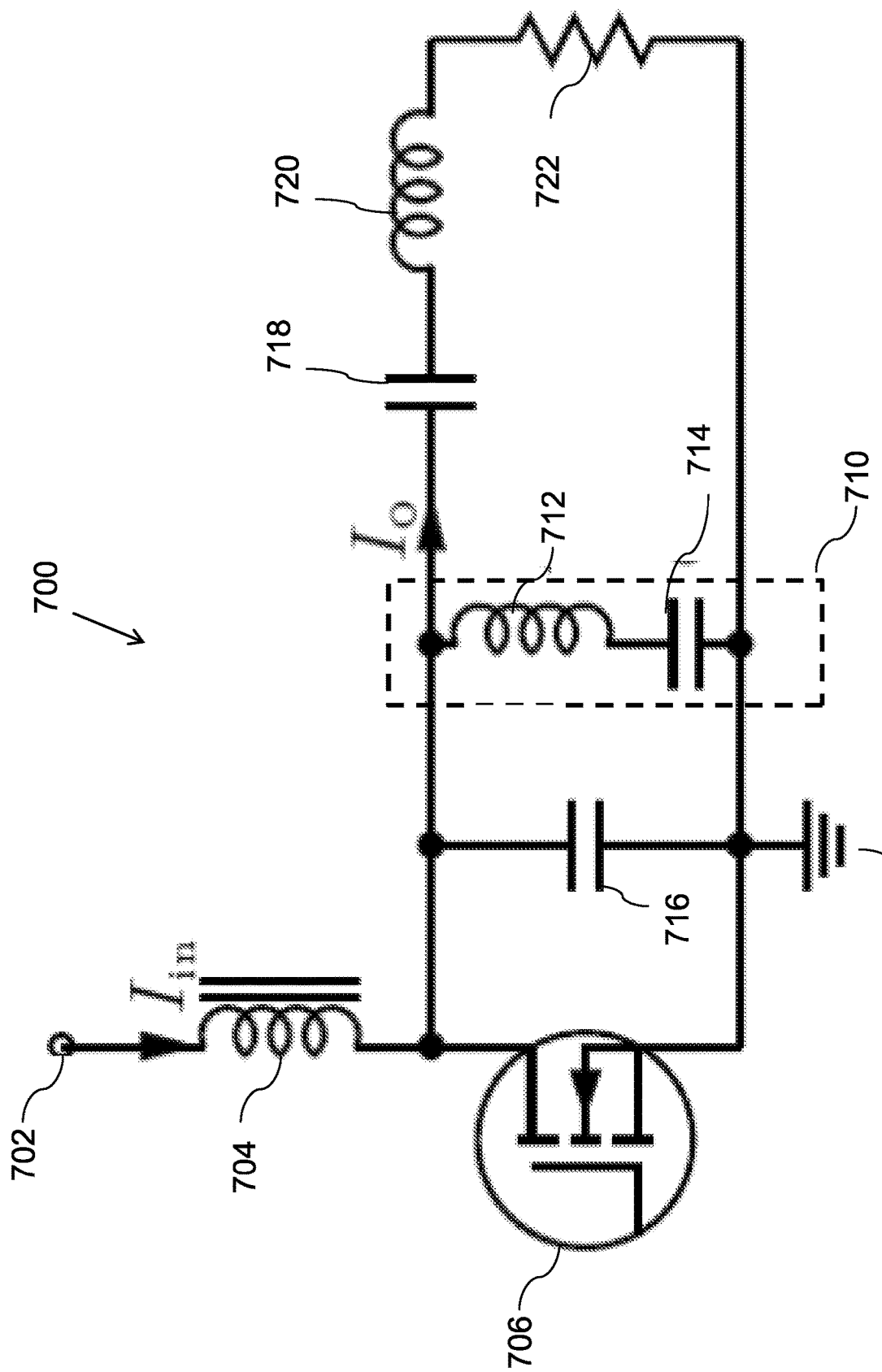
FIG. 7 depicts a circuit arrangement for a Class-EF inverter which may be coupled to rectifier arrangements of the present disclosure.
Figure 8A:
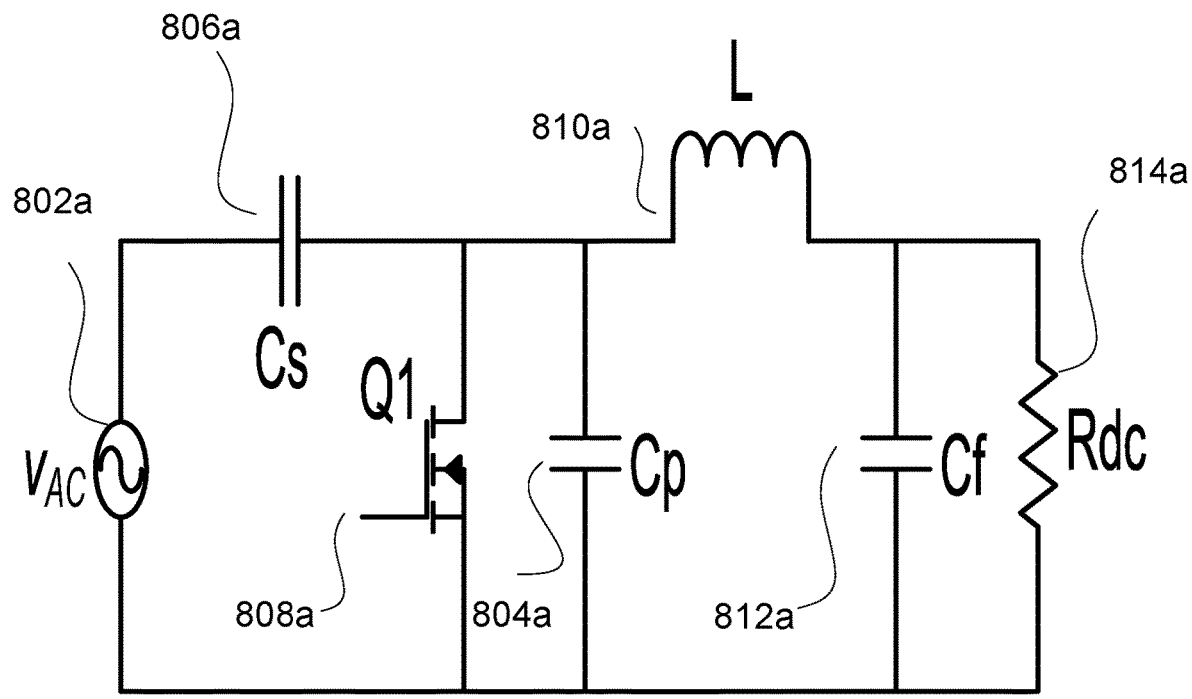
FIG. 8a depicts a hybrid synchronous Class-E rectifier in accordance with the present disclosure.
Figure 8B:
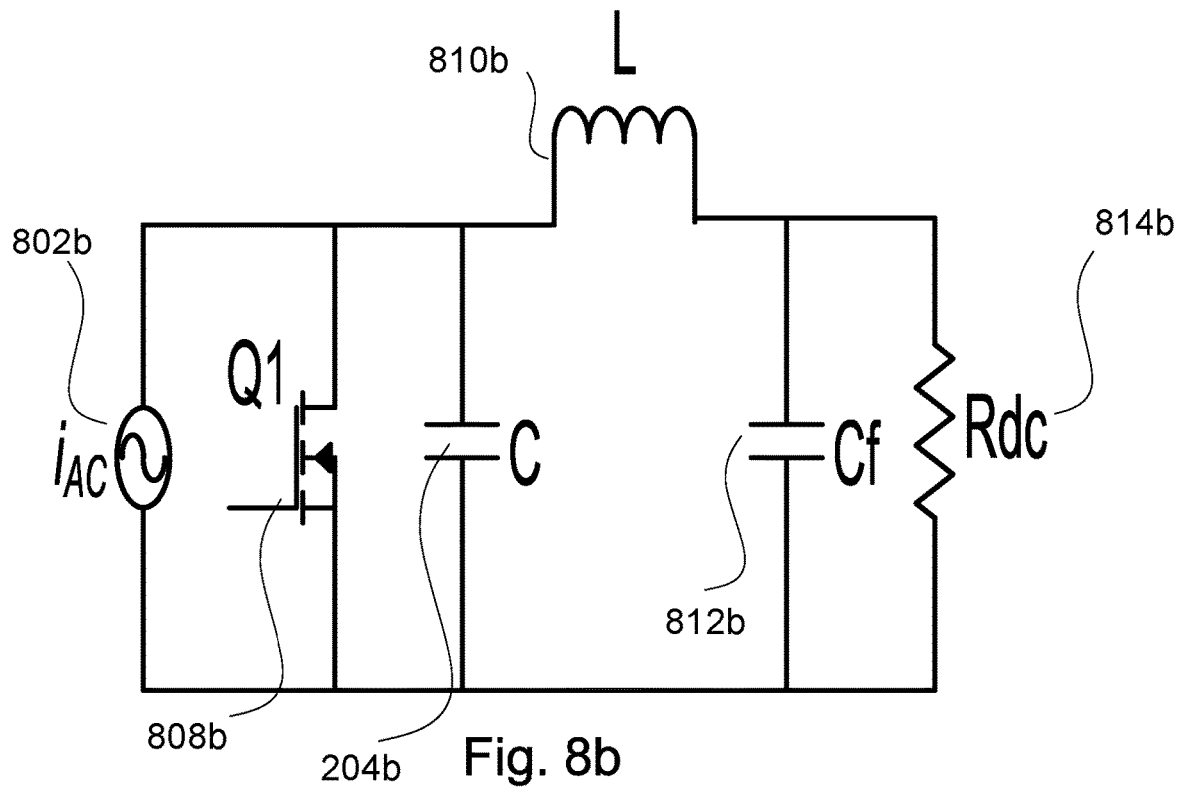
FIG. 8b depicts a current driven synchronous Class-E rectifier in accordance with the present disclosure.
Figure 8C:
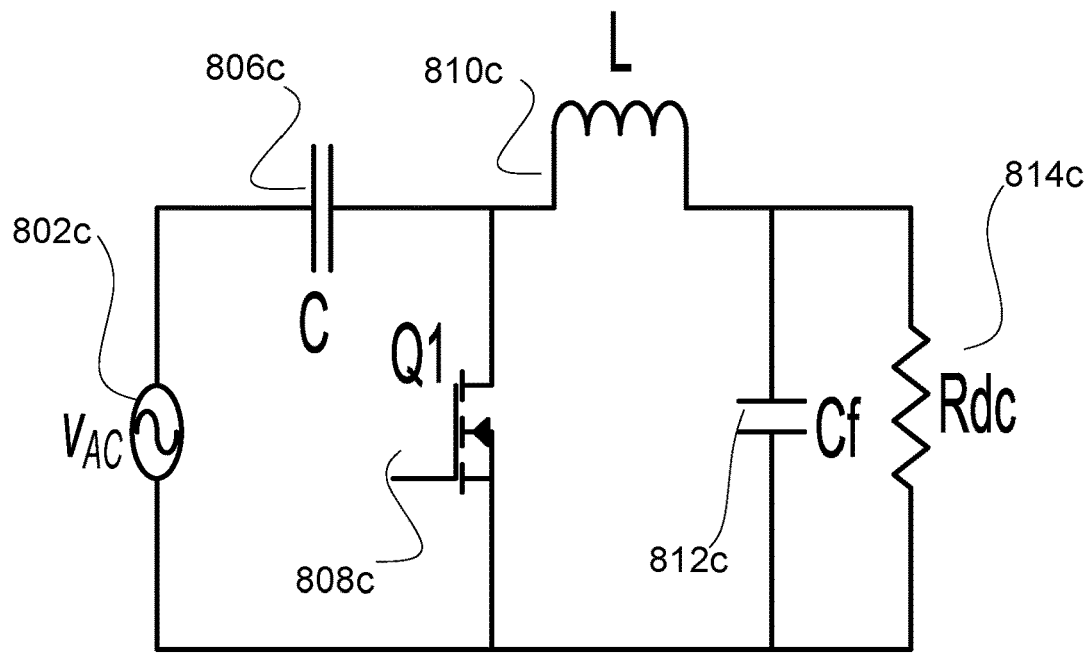
FIG. 8c depicts a voltage driven series-C synchronous Class-E rectifier.
Figure 8D:
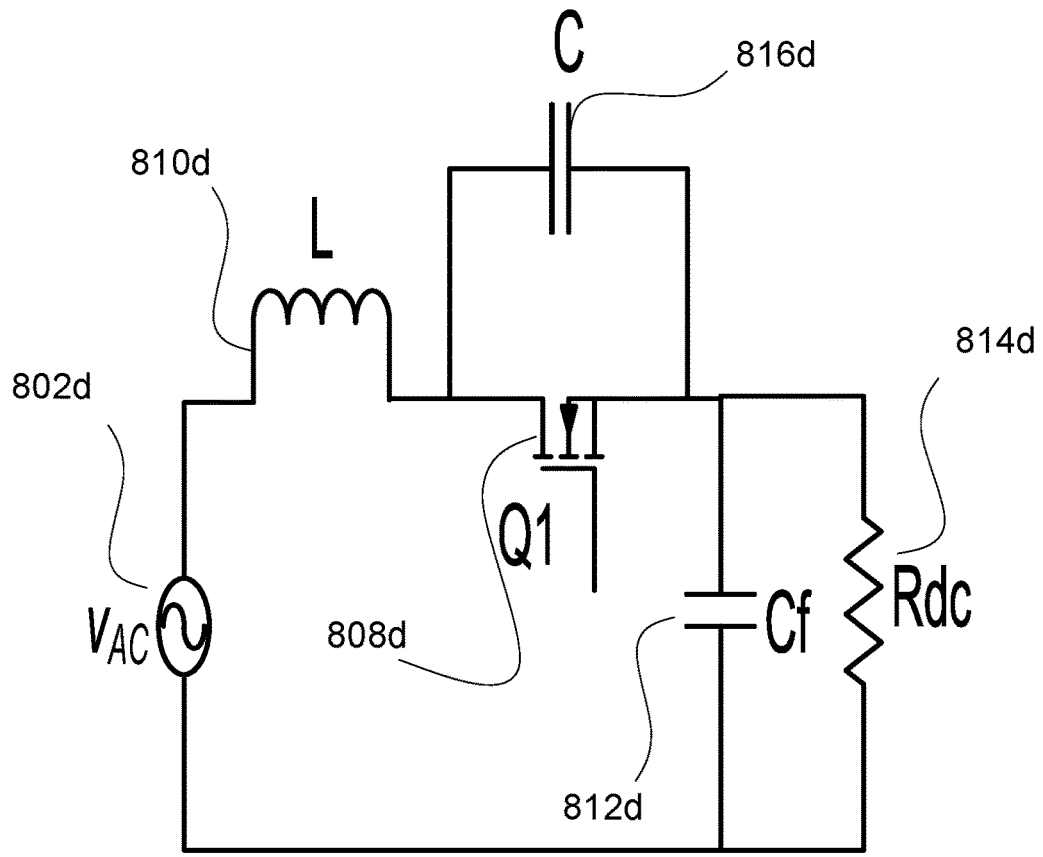
FIG. 8d depicts a voltage driven series-L synchronous Class-E rectifier in accordance with the present disclosure.

A schematic circuit diagram of a suitable inverter in shown in FIG. 7. The inverter 700 is based on a class E inverter, and more particularly is based on a class 'EF' inverter. In operation, the inverter 100 converts direct current (DC) from a power source 702 to alternating current (AC).

The inverter 700 incorporates a transistor 706. The transistor 706 may be a metal-oxide-semiconductor field-effect transistor 706 (MOSFET) as is known in the art. FIG. 1 shows an n-channel MOSFET. The transistor 706 is coupled to a first inductor 704 having a first inductance $L_1$. The first inductor 704 is coupled to the transistor 706 via a first transistor node, which, in the case that the transistor 706 is an N-channel MOSFET as in FIG. 1, will be the 'drive' node. The first inductor 704 is in turn coupled to a power source 702, which is arranged to provide a DC input signal to the inverter 700. The transistor 706 is also coupled to ground 708 via a second node which, in the case that the transistor 706 is an n-channel MOSFET, will be the 'source' node. Finally, the transistor 706 is switched on/off via a third transistor node which, in the case that the transistor 706 is an n-channel MOSFET, will be the 'gate' node. The transistor 706 can be switched on/off by applying an input from, for example, a signal generator (not shown). Typically, the signal generator produces a square wave input signal.

A first capacitor 716 having a first capacitance $C_1$ is connected in parallel with the transistor 706, between the first inductor 704 and ground 708. It will be appreciated that capacitor $C_1$ allows the inverter 106 to operate in a ZVS mode. The voltage on $C_1$ naturally falls to zero twice per cycle and these two events are the point where the transistor changes state. Thus, it is the function of the complete circuit (all the components operating together) that gives rise to these zero volt instances. The existence of the capacitor C1 means there is a finite rate of change of voltage across the transistor giving a finite time for it to change state.

A resonant circuit 710 is also connected in parallel between the first inductor 704 and ground 708. The resonant circuit 710 has a second inductor 712 having an inductance $L_2$, and a second capacitor 714 having a second capacitance $C_2$. The resonant circuit 710 has a resonant frequency $F_T$, which is dependent on the values of $C_2$ and $L_2$ as will be appreciated by those skilled in the art.

In embodiments of the present disclosure, the resonant circuit 710 is designed to have a resonant frequency $F_t$ which is a non-integer multiple of the transistor 1206 switching frequency $F_{sw}$. Preferably, the non-integer multiple is between 1 and 2, is more preferably between 1.5 and 1.65, and is even more preferably equal to 1.5.

A third capacitor 718 having a third capacitance $C_3$, a third inductor 718 having a third inductance $L_3$, and a transmitter coil (not shown) are also connected in parallel with the transistor 706 and the first capacitor 716. The resistance of the transmitting coil forms part of the resistive load 722 of the inverter 100. In operation, the resistive load 722 of the inverter 700 is also increased in accordance with the respective resistive loads of any receiver coils within the IPT system. These respective receiver loads are 'reflected' to the transmitter coil when the IPT system is in operation, as will be understood by the skilled person. The value of the load may depend on the turns ratio and coupling factor, and can be considered to include the loss resistance of the receiver coil. It will thus be understood that the resistive load 722 experienced by the inverter 700 can vary as the receiver coils change in number, orientation, size or distance from the transmitter coil.

In the circuit of FIG. 1, $I_{in}$, is the steady input current. A significant DC component with little current ripple is expected. $I_o$ is the sinusoidal output current that flows in the transmit coil.

In operation, the power source 702 supplies a DC input signal to the inverter. The transistor 706 is switched on and off at a switching frequency $F_{sw}$. This has the effect of producing an AC output signal, which passes through the load. As the AC current passes through the transmitter coil, a time-varying magnetic field is produced.

As will be appreciated by those skilled in the art, switching the transistor 706 on or off whilst a non-zero current or voltage is passing through the transistor 706 gives rise to switching losses through the transistor 706, in accordance with the well-known equation P=IV; where P is the loss of energy in the transistor 106 per second, I is the current passing through the transistor 706 and V is the voltage across the transistor 706.

The resonant circuit 710, which has a resonant frequency which is a non-integer multiple of the switching frequency, acts to keep the current flowing through the transmitter coil constant, as will be described in more detail below.

It will be appreciated that other types of inverter can be used with Class-E rectifiers described herein, for example Class-D inverters and Class-E inverters.

Figure 10:
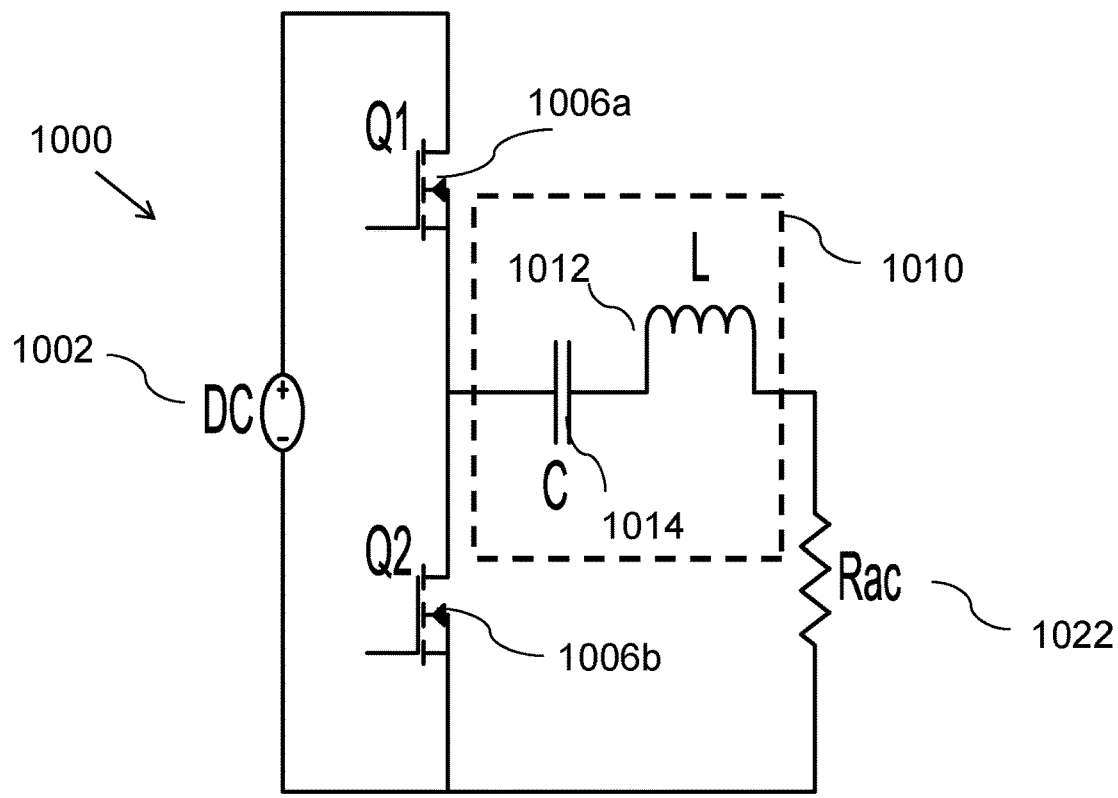
FIG. 10 depicts a Class-D inverter which may be coupled to rectifier arrangements of the present disclosure.

FIG. 10 shows a Class-D inverter 1300. The inverter comprises a voltage source 1002. The Class-D inverter comprises a half-bridge configuration. The half-bridge circuit consists of an upper and a lower switch, for example two MOSFET switches 1006a, 1006b. The switches 1006a and 1006b can be driven by an external signal as would be understood by the person skilled in the art. The half-bridge configuration is connected with a series tuned inductor capacitor network 1010 comprising a capacitor 1014 having a capacitance C and an inductor 1012 having an inductance L. The Class-D inverter 1000 also comprises an AC load resistor 1022. In the case of a resonant converter the AC load resistor 1022 is represented by the input terminals of the rectifier (with the addition of the input reactance of the rectifier) and in the case of an inductive power transfer system the AC load is the reflected resistance from the receiving resonant tank.

The conventional operation of a Class-D inverter 1000 requires the resonant network of the inverter, e.g. the inductor 1012 and capacitor 1014 at the output of the inverter, to be at resonance at the frequency of operation. In other words, prior Class-D circuits have always been designed such that the operating frequency/switching frequency is an integer multiple of the frequency of operation.

However, by changing the resonant frequency of the inductor-capacitor network 1010 such that it is away from the operating frequency, the inverter can output a constant amplitude current at the operating frequency. In other words, the resonant network is designed such that it has a resonant frequency which is a non-integer multiple of the switching frequency/operating frequency. This allows the inverter to operate with a substantially constant current passing through the load resistance, even as the load varies. To achieve constant output current in this manner, the AC load resistance should also be smaller than the residual reactance of the inductor-capacitor network 1010 at the frequency of operation.

When operating away from resonance it is beneficial to have an inductive residual reactance from the inductor-capacitor network at the frequency of operation as an inductive residual reactance contributes in the elimination of turn ON losses in the transistors of the half-bridge while the turn OFF losses in the transistors can be adjusted based on the magnitude of the reactance.

The class-D inverter 1000 can be designed to give constant current as the rectifier load resistance increases, if the circuit is tuned such that the inverter 1300 drives a residual inductance at the operating frequency. This can be achieved using class-E rectifiers having an $A_r$ value between 1.75 and 3.

Figure 9:
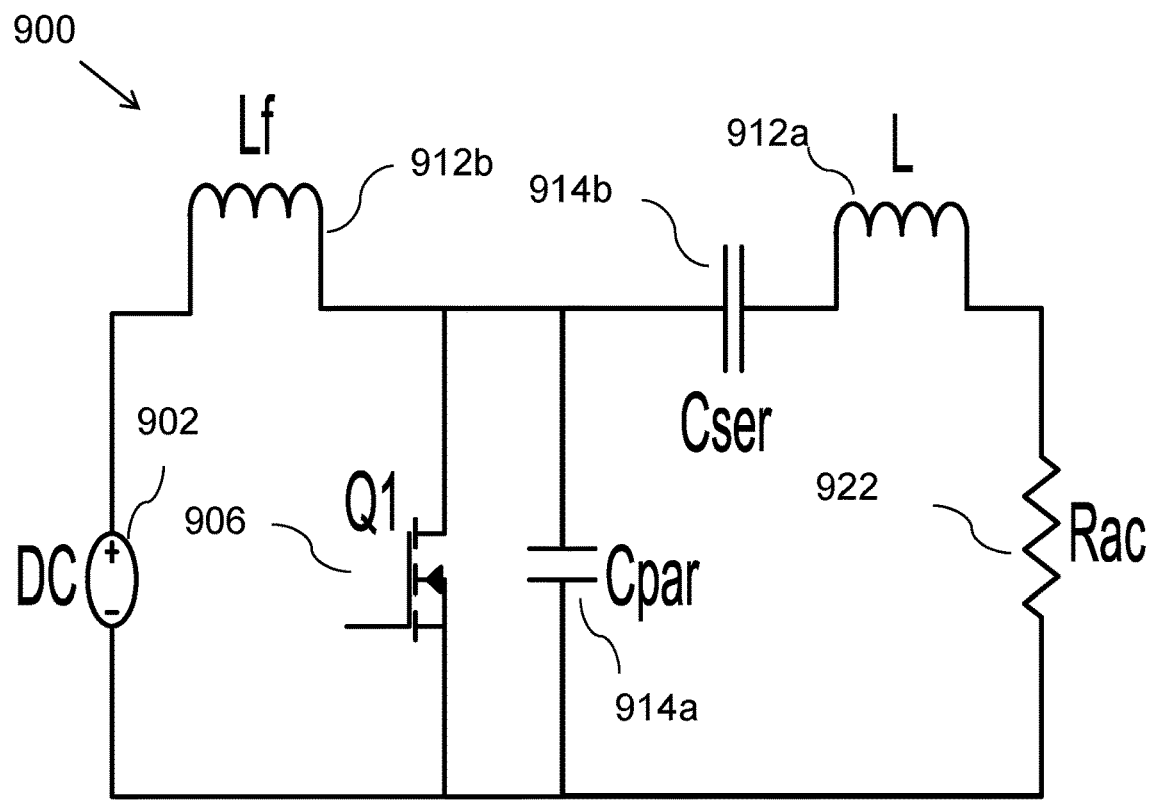
FIG. 9 depicts a Class-E inverter which may be coupled to rectifier arrangements of the present disclosure.

FIG. 9 shows a Class-E inverter 900. The Class-E inverter 900 comprises a switching device such as a transistor 906. The transistor 906 is connected in parallel with a capacitor 914a and an output load network. The transistor can be turned on and off by an external signal. The external signal may be provided, for example, by a gate drive circuit. The gate drive circuit typically comprises further transistors which are capable of providing the required amount of charge to the gate capacitance of the transistor of the power circuit. The transistors within the gate drive circuit are controlled by a digital, i.e. small, signal, which could be provided by, for example, a microcontroller. The output load network is formed by the series combination of an inductor 912a and a capacitor 914b and an AC load resistor 922. The inverter 900 has a current input which is provided by the series connection of a voltage source 902 and an inductor 912b. The AC load resistor 922 is represented by either the input terminals of the rectifier in resonant power converter applications or by the reflected resistance of the receiver in inductive power transfer systems.

In the conventional operation of a Class-E inverter 900, the passive components of the circuit are evaluated such that the transistor 906 experiences zero voltage when it turns ON and OFF (ZVS), and zero voltage derivative when it turns ON (ZDS). However, surprisingly, it has been found that by relaxing the last constraint of zero voltage derivative, while keeping ZVS, and designing the inverter 900 such that the derivative of the voltage across the transistor 906 when it turns ON is negative, the amplitude of the current in the output load network, the series combination of an inductor-capacitor 912a, 914b and an AC load resistor 922, has a small deviation as the output AC resistor decreases from its initial value. The derivative is a time derivative, and can be thought of as the rate of change of the voltage. The greater the magnitude of the transistor voltage derivative, the lower the deviation in the magnitude of the current through the output load network. In other words, the class-E inverter can be designed to give an approximately constant current by relaxing the condition on zero derivative switching.

Further advantages of the presently disclosed rectifier and inverter arrangements will now be discussed.

Having a low deviation input reactance with varying output load is advantageous for IPT and resonant converter applications since the resonant tank in the system (e.g. a receiving end of an IPT or the output of the inverter in a resonant converter) will always experience the same reactance from the input terminals of the rectifier. This is because when a rectifier is added to an inductive link, it will introduce some reactance to the resonant tank at the receiving end of the link. The resonant tank consists of the receiving coil and the tuning capacitor. The tuning capacitor value will take into account the reactance presented by the rectifier. The sum of the reactances of the receiving coil, tuning capacitor and the reactance of rectifier should equal to zero, i.e. resonate at the frequency of operation. When the DC load of the rectifier changes, the presently disclosed arrangement ensures that the input reactance will deviate insignificantly, such that the sum of reactances will remain zero. Cancelling out the reactance of the receiving coil (or tuning the coil) means that high link efficiency can be achieved.

Further to the low input reactance deviation property, at the $A_r$ range between 1.75 to 3 the topologies of the present disclosure present an inherent voltage regulation with varying $R_{dc}$ if the amplitude of the input source remains constant. Therefore, additional control circuitry for voltage regulation can be removed, improving end-to-end efficiency and reducing PCB real estate requirements.

The Class-E operating mode of the present disclosure does not detune the resonant tank(s) of the system when the output DC resistance increases. Furthermore, at this operating mode, inherent voltage regulation is achieved by the rectifier making the circuit independent of control and energy storage components. These are two features that significantly improve the real world performance of IPT systems and resonant power converters.

As discussed above, prior arrangements suffered from the problem of a variation in the Class-E rectifier's input reactance as the DC load of the system changes. A Class-E rectifier designed with an $A_r$ within the range of 1.75 to 3 compresses the variation of its input reactance as the duty cycle decreases. Although it will introduce some reactance to the circuit that is going to be connected with, this reactance can be absorbed in the resonant tank that provides the sinusoidal input for the rectifier, e.g. the receiving end of an inductive link or the output of an inverter in a resonant DC/DC converter. As the deviation in the input reactance of the Class-E rectifier will be low when the duty cycle changes, the resonant tank will not be affected because it is already compensating for the same reactance. Class-E rectifier designs at different $A_r$ values will present reactances with magnitude that is dependent on the duty cycle and will hence affect the resonant tank used to provide the sinusoidal input for the rectifier since the tank can only compensate for a specific reactance.

As also discussed above, it has proved difficult in prior systems to regulate the output voltage of the system. The input resistance of a Class-E rectifier designed with an Ar within the range of 1.75 to 3 has a monotonic behavior as the duty cycle decreases due to the increase of the output load ($R_{dc}$). This monotonic input resistance behavior along with the low deviation in input reactance result in the decrease of the power extracted by the input source when $R_{dc}$ increases; assuming the magnitude of the source remains constant. This decrease of extracted power from the source results in the current delivered to the output load ($R_{dc}$) to be proportional to the magnitude of $R_{dc}$. Therefore, the output voltage is inherently regulated as the output DC load increases.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A rectifier circuit for receiving an AC signal in an inductive power transfer system, the circuit being configured to operate at an operating frequency, the circuit comprising:
   a Class-E rectifier; and
   an AC signal supplier comprising a receiver coil and configured to supply an AC signal to the rectifier circuit;
   the Class-E rectifier comprising a resonant network means having an LC circuit that includes an inductor and a capacitor, wherein the resonant network means has a resonant frequency, and wherein the ratio of the resonant frequency to the operating frequency is within the range of 1.75 to 3.

2. The rectifier circuit of claim 1, wherein the inductor of the resonant network means is coupled to the AC signal supplier.

3. The rectifier circuit of claim 1, wherein the receiver coil is an air core coil.

4. The rectifier circuit of claim 1, wherein the operating frequency is determined by the AC signal from the receiver coil.

5. The rectifier circuit of claim 1, wherein the rectifier circuit is coupled to a Class-D inverter, and the operating frequency is determined by the output frequency of the Class-D inverter.

6. The rectifier circuit of claim 1, wherein the rectifier circuit is coupled to a Class-E inverter, and the operating frequency is determined by the output frequency of the Class-E inverter.

7. The rectifier circuit of claim 1, wherein the rectifier circuit is coupled to a Class-EF inverter, and the operating frequency is determined by the output frequency of the Class-EF inverter.

8. The rectifier circuit of claim 5, wherein
   the inverter is arranged to drive a load resistance, and comprises a switching device arranged between a power source and ground and arranged to switch at a switching frequency; and
   the resonant network means is arranged in parallel with the switching device between the power source and ground, the resonant network means having a resonant frequency which is a non-integer multiple of the switching frequency, such that, in operation, a substantially constant current passes through the load resistance.

9. The rectifier circuit of claim 1, wherein the operating frequency is determined by the output frequency of a resonant tank circuit comprising an inductor and a capacitor.

10. The rectifier circuit of claim 1, wherein the ratio of the resonant frequency to the operating frequency is within the range 1.75 to 2.

11. The rectifier circuit of claim 1, wherein the resonant network circuit further comprises a diode, and optionally wherein a parallel capacitor is placed across the diode.

12. The rectifier circuit of claim 11, wherein:
   the AC signal is an input voltage;
   the capacitor of the resonant network means is coupled to the input voltage and has a capacitance $C_s$;
   and wherein the parallel capacitor has a capacitance $C_p$, the ratio of $C_p$ to $C_s$ being above zero.

13. The rectifier circuit of claim 11, wherein the rectifier is a non-synchronous rectifier.

14. The rectifier circuit of claim 1, wherein the ratio of the resonant frequency to the operating frequency is within the range 2 to 3.

15. The rectifier circuit of claim 1, wherein the rectifier circuit further comprises a transistor.

16. The rectifier circuit of claim 1, wherein the rectifier is a synchronous rectifier.

17. A combined inverter-rectifier circuit comprising:
   a rectifier circuit coupled with an inverter circuit,
   wherein the rectifier circuit is as claimed in claim 1, and
   the inverter circuit is suitable for Class-EF operation, the inverter circuit is arranged to drive a load resistance, and the inverter circuit includes:
      a switching device arranged between a power source and ground, the switching device arranged to switch at a switching frequency; and
      the rectifier circuit comprising a resonant network means arranged in parallel with the switching device between the power source and ground, the resonant network means having a resonant frequency which is a non-integer multiple of the switching frequency, such that, in operation, a substantially constant current passes through the load resistance.

18. The combined inverter-rectifier circuit 18, wherein the load resistance comprises the reflected resistance of at least one receiver coil.

19. The combined inverter-rectifier circuit of claim 17, wherein the load resistance comprises the reflected resistance from a receiving resonant tank circuit.

* * * * *

UNITED STATES PATENT AND TRADEMARK OFFICE
CERTIFICATE OF CORRECTION

PATENT NO. : 11,404,911 B2
APPLICATION NO. : 16/464808
DATED : August 2, 2022
INVENTOR(S) : Yates et al.

It is certified that error appears in the above-identified patent and that said Letters Patent is hereby corrected as shown below:

On the Title Page

Item (71) Applicant:
"(71) Applicant: INPERIAL COLLEGE INNOVATIONS LIMITED, London (GB)"
Should be:
-- (71) Applicant: IMPERIAL COLLEGE INNOVATIONS LIMITED, London (GB) --.

Signed and Sealed this
Eleventh Day of October, 2022

Katherine Kelly Vidal
*Director of the United States Patent and Trademark Office*